USO10823194B2

United States Patent
Jothiprasad et al.

(10) Patent No.: US 10,823,194 B2
(45) Date of Patent: Nov. 3, 2020

(54) COMPRESSOR END-WALL TREATMENT WITH MULTIPLE FLOW AXES

(71) Applicant: General Electric Company, Schenectady, NY (US)

(72) Inventors: Giridhar Jothiprasad, Clifton Park, NY (US); Ramakrishna Venkata Mallina, Clifton Park, NY (US); John David Stampfli, Greer, SC (US); Rudolf Konrad Selmeier, Fahrenzhausen (DE); Davide Giacché, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1009 days.

(21) Appl. No.: 14/556,315

(22) Filed: Dec. 1, 2014

(65) Prior Publication Data

US 2016/0153360 A1 Jun. 2, 2016

(51) Int. Cl.
*F04D 29/40* (2006.01)
*F01D 5/14* (2006.01)
(Continued)

(52) U.S. Cl.
CPC .......... *F04D 29/403* (2013.01); *F01D 5/143* (2013.01); *F01D 5/145* (2013.01); *F01D 25/24* (2013.01);
(Continued)

(58) Field of Classification Search
CPC ........ F01D 25/24; F01D 25/143; F01D 11/08; F01D 11/14; F01D 5/143; F01D 29/685; F04D 29/685; F04D 29/68; F02C 3/04
See application file for complete search history.

(56) References Cited

U.S. PATENT DOCUMENTS 5,137,419 A    8/1992   Waterman
5,707,206 A    1/1998   Goto et al.
(Continued)

FOREIGN PATENT DOCUMENTS

CA    2392427 C    9/2010
CA    2705622 C    9/2013
(Continued)

OTHER PUBLICATIONS

Wu-Li et al., "Numerical and Experimental Investigations of the Flow in a Compressor with Circumferential Grooves", Journal of Aerospace Power, vol. 21 No. 1, Feb. 2006, 6 Pages.
(Continued)

*Primary Examiner* — Ehud Gartenberg
*Assistant Examiner* — Thuyhang N Nguyen
(74) *Attorney, Agent, or Firm* — The Small Patent Law Group LLC; Josef L. Hoffmann

(57) ABSTRACT

A compressor is provided including a casing, a hub, a flow path, a plurality of blades, and an end-wall treatment formed in at least one of the casing and the hub, and facing a tip of each blade. The flow path is formed between the casing and the hub, and the plurality of blades is positioned in the flow path. The tip of each blade and the end-wall treatment are configured to move relative to each other. Such end-wall treatment includes a first recess portion extending along a first axis to maintain a fluid flow substantially straight through the first recess portion. The end-wall treatment further includes a plurality of second recess portions spaced apart from each other and extending from the first recess portion along a second axis different than the first axis to maintain the fluid flow substantially straight through the plurality of second recess portions.

20 Claims, 14 Drawing Sheets

(51) Int. Cl.
    *F01D 25/24* (2006.01)
    *F04D 29/52* (2006.01)
    *F04D 29/68* (2006.01)

(52) U.S. Cl.
    CPC ......... *F04D 29/526* (2013.01); *F04D 29/685* (2013.01); *Y02T 50/60* (2013.01)

(56) References Cited

U.S. PATENT DOCUMENTS

| | | |
|---|---|---|
| 6,164,911 A | 12/2000 | Leblanc et al. |
| 6,435,819 B2 * | 8/2002 | Irie ................. F01D 5/145 415/119 |
| 6,742,983 B2 | 6/2004 | Schmuecker |
| 7,186,072 B2 * | 3/2007 | Seitz ................. F01D 5/145 415/57.1 |
| 7,575,412 B2 * | 8/2009 | Seitz ................. F01D 5/145 415/58.5 |
| 7,600,965 B2 | 10/2009 | Seitz |
| 7,811,052 B2 | 10/2010 | Guihard et al. |
| 8,251,648 B2 | 8/2012 | Johann |
| 8,337,146 B2 | 12/2012 | Yu |
| 8,438,855 B2 | 5/2013 | Schott |
| 8,550,768 B2 | 10/2013 | Montgomery |
| 8,573,946 B2 | 11/2013 | Power et al. |
| 8,602,720 B2 | 12/2013 | Goswami et al. |
| 8,672,618 B2 | 3/2014 | Guemmer |
| 2008/0044273 A1 | 2/2008 | Khalid |
| 2012/0163967 A1 | 6/2012 | Krautheim |
| 2016/0153360 A1 | 6/2016 | Jothifrasad et al. |
| 2016/0153465 A1 | 6/2016 | Yoon et al. |
| 2016/0169017 A1 | 6/2016 | Giacché et al. |
| 2017/0328377 A1 | 11/2017 | Mallina et al. |

FOREIGN PATENT DOCUMENTS

| | | |
|---|---|---|
| CN | 1190597 C | 2/2005 |
| CN | 201176968 Y | 1/2009 |
| CN | 202833326 U | 3/2013 |
| WO | 2014018270 A1 | 1/2014 |

OTHER PUBLICATIONS

Prince et al., "Study of Casing Treatment Stall Margin Improvement Phenomena", NASA Technical Reports Server (NTRS), Mar. 1, 1974, 178 Pages.

* cited by examiner

COMPRESSOR END-WALL TREATMENT WITH MULTIPLE FLOW AXES

BACKGROUND

The present invention relates to a compressor, and more particularly to an end-wall treatment disposed in a casing and/or a hub of such compressor.

Compressors used in engines such as a gas turbine, may include a plurality of stages arranged along a length of the compressor. Each stage may include a hub and a plurality of rotor blades arranged about a circumference of the hub. In addition, each stage may further include a plurality of stator blades, disposed alternately to the plurality of rotor blades and arranged about a circumference of a casing of the compressor.

During operation of such gas turbine, the hub of the compressor may be rotated at high speed by a turbine, such that a fluid is continuously induced into the compressor. The fluid is accelerated by the rotating rotor blades and swept rearwards onto the adjacent rows of the stator blades. At each stage, the rotor blade and/or stator blade increases pressure of the fluid. In addition, during operation of the compressor, a portion of the fluid may flow about a tip of each rotor blade and/or stator blade as a leakage flow. Such stage-to-stage leakage of compressed fluid as the leakage flow affects the stable operating range of the compressor and adversely affects the efficiency of the gas turbine. The operating point at which the compressor starts operating in an unstable condition may be referred to as the stall point of the compressor.

The operating range of the compressor is generally limited due to weak flow at the tip of the blade. Prior attempts to increase the operating range and improve the stall margin have included flow control based techniques such as plasma actuation and suction/blowing near a blade tip. However, such attempts may significantly increase complexity and weight of the compressor. Other attempts include end-wall treatments such as circumferential grooves, axial grooves, and the like. Early attempts on such end-wall treatments have a substantial impact on design point efficiency with very minimal benefit in improving the stall margin of the compressor.

Thus, there is a need for an improved end-wall treatment for a compressor and an associated method for controlling a leakage flow about one or more blade tips and thereby improving a stall margin of the compressor.

BRIEF DESCRIPTION OF THE DISCLOSURE

In one embodiment, a compressor includes a casing, a hub, a flow path, a plurality of blades, and an end-wall treatment formed in at least one of the casing and the hub, and facing a tip of each blade among the plurality of blades. The flow path is formed between the casing and the hub, and the plurality of blades is positioned in the flow path. The tip of each blade and the end-wall treatment are configured to move relative to each other. Further, the end-wall treatment includes a first recess portion extending along a first axis to maintain a fluid flow substantially straight through the first recess portion. The end-wall treatment further includes a plurality of second recess portions spaced apart from each other and extending from the first recess portion along a second axis different than the first axis to maintain the fluid flow substantially straight through the plurality of second recess portions.

In another embodiment, an engine includes a compressor, a combustor, and a turbine which are configured in a downstream axial flow relationship. The compressor in such engine includes a casing, a hub, a flow path, a plurality of blades, and an end-wall treatment formed in at least one of the casing and the hub, and facing a tip of each blade among the plurality of blades. The flow path is formed between the casing and the hub, and the plurality of blades is positioned in the flow path. The tip of each blade and the end-wall treatment are configured to move relative to each other. Further, the end-wall treatment includes a first recess portion extending along a first axis to maintain a fluid flow substantially straight through the first recess portion. The end-wall treatment further includes a plurality of second recess portions spaced apart from each other and extending from the first recess portion along a second axis different than the first axis to maintain the fluid flow substantially straight through the plurality of second recess portions.

In one embodiment, a method includes introducing a fluid flow along a flow path formed between a casing and a hub of a compressor, extracting a portion of the fluid flow into an end-wall treatment formed in at least one of the casing and the hub, and facing a tip of each blade among the plurality of blades positioned in the flow path. The method further includes flowing the portion of the fluid flow along a first axis to maintain the fluid flow substantially straight through a first recess portion of the end-wall treatment, and along a second axis to maintain the fluid flow substantially straight through a plurality of second recess portions of the end-wall treatment. The first recess portion extends along the first axis, and the plurality of second recess portions is spaced apart from each other and extends from the first recess portion along the second axis different than the first axis. In such embodiment, the tip of each blade and the end-wall treatment are configured to move relative to each other.

DRAWINGS

These and other features and aspects of embodiments of the present technology will become better understood when the following detailed description is read with reference to the accompanying drawings in which like characters represent like parts throughout the drawings, wherein.

DETAILED DESCRIPTION

Embodiments discussed herein disclose an improved compressor for deployment in engines such as a gas turbine, a steam turbine, and the like. The compressor may be an axial flow compressor and according to one embodiment such compressor includes an end-wall treatment which is configured to reduce a leakage flow and improve a stall margin with minimal penalty on design point efficiency of the compressor. In one embodiment of the present invention such end-wall treatment is formed in at least one of a casing and a hub of the compressor, and faces a tip of each blade among a plurality of blades positioned in a flow path of the compressor. The tip of each blade and the end-wall treatment are configured to move relative to each other. Such end-wall treatment includes a first recess portion extending along a first axis to maintain a fluid flow substantially straight through the first recess portion. The end-wall treatment further includes a plurality of second recess portions spaced apart from each other and extending from the first recess portion along a second axis different than the first axis to maintain the fluid flow substantially straight through the plurality of second recess portions.

Figure 1:
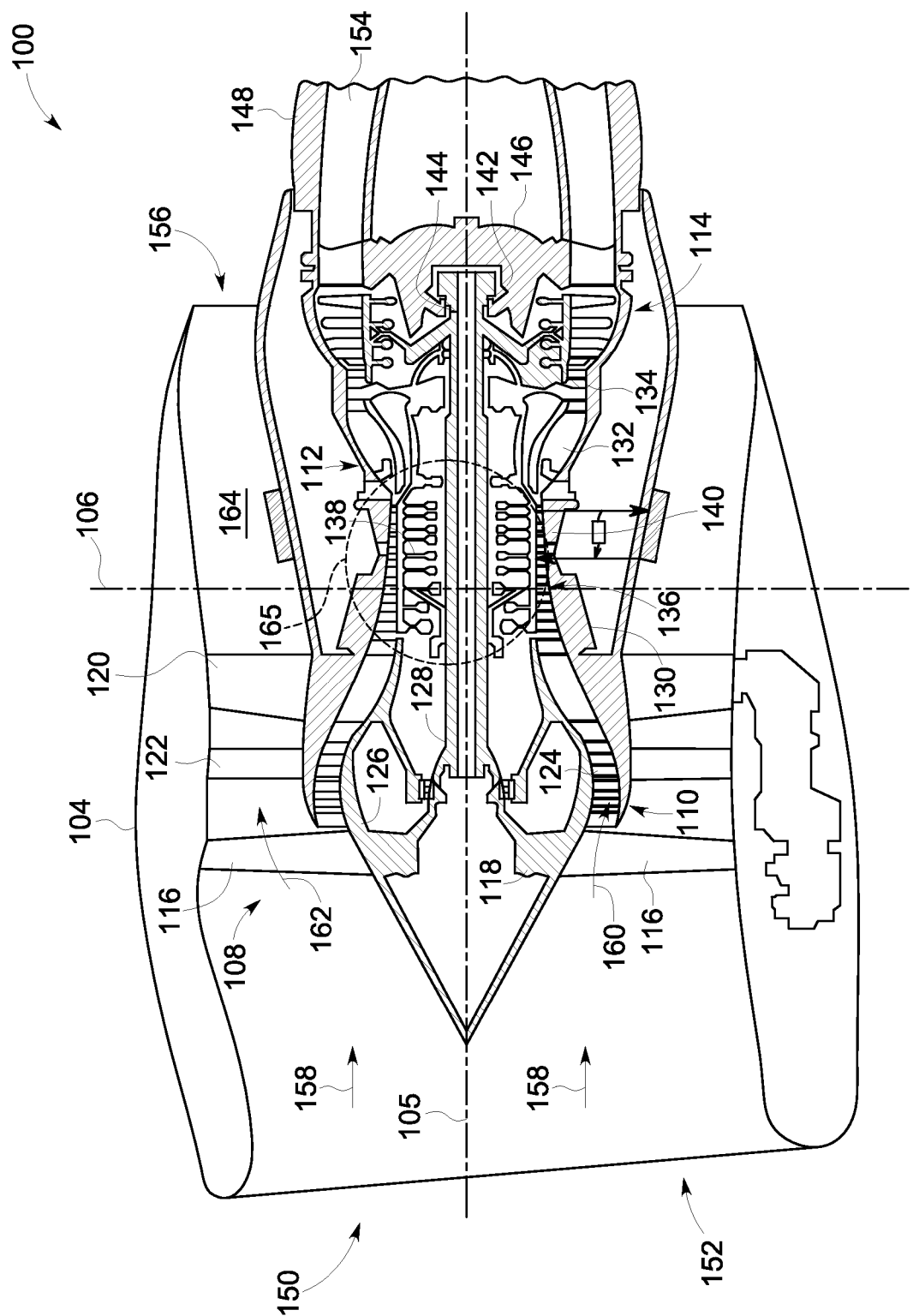
FIG. 1 is a schematic cross-sectional view of a portion of an engine assembly including a compressor in accordance with one or more embodiments shown or described herein.

Referring to the drawings wherein identical reference numerals denote the same elements throughout the various views, FIG. 1 depict a schematic illustration of an exemplary engine assembly 100, for example an aircraft engine assembly. The engine assembly 100 has a longitudinal axis 105 and an outer stationary annular fan casing 104 disposed concentrically about and coaxially along the longitudinal axis 105. In addition, the engine assembly 100 has a radial axis 106. In one exemplary embodiment, the engine assembly 100 includes a fan assembly 108, a booster compressor 110, an engine 112, and a low-pressure turbine 114 that may be coupled to the fan assembly 108 and the booster compressor 110.

The fan assembly 108 includes a plurality of rotor fan blades 116 that extend substantially radially outward from a fan rotor disk 118 and outlet guide blades (OGVs) 120 for providing aerodynamic function, positioned downstream of the rotor fan blades 116. Further, the fan assembly 108 includes a plurality of structural strut members 122 for providing structural support. In this example, separate members are used for providing the aerodynamic function and structural support to the outer stationary annular fan casing 104. In other configurations, the OGVs 120 may provide both aerodynamic function and structural support for the outer stationary annular fan casing 104. The booster compressor 110 includes a plurality of rotor blades 124 that extend substantially radially outward from a compressor rotor disk or hub 126 coupled to a first drive shaft 128. The engine 112 includes a compressor 130, a combustor 132, and a turbine 134. In the illustrated embodiment, the compressor 130, the combustor 132, and the turbine 134 are configured in a downstream axial flow relationship. The compressor 130 includes a flow path (not labeled in FIG. 1) and a plurality of blades 136 positioned in the flow path, particularly, formed in a hub 138 and a casing 140 of the compressor 130. The plurality of blades 136 may include a rotor blade (not shown in FIG. 1) that may extend substantially radially outward from the hub 138 and a stator blade (not shown in FIG. 1) that may extend substantially radially inward from the casing 140. In one embodiment, the stator blade may be integral part of the casing 140 or may be coupled to the casing 140 via a suitable coupling means such as a cantilever, a hook, and the like. The compressor 130 and the turbine 134 are coupled together by a second drive shaft 142. The first and second drive shafts 128 and 142 are rotatably mounted on bearings 144 which are mounted in a fan frame 146 and a turbine rear frame 148. The engine assembly 100 also includes an intake side 150, defining a fan intake 152, an exhaust side 154, and a fan exhaust side 156. In one or more embodiments, the compressor 130 disposed upstream relative to the combustor 132, includes an end-wall treatment (not shown in FIG. 1) represented by a dotted circle 165, formed in the casing 140 and the hub 138. In some other embodiments, the end-wall treatment may be disposed in the booster compressor 110, the fan assembly 108 of the engine assembly 100, and the like without deviating from the scope of the present invention. As illustrated in the embodiment of FIG. 1, the compressor 130 may be used in the aircraft engine. In certain other embodiments, the compressor 130 may be used in power generation applications, power and water industries, oil and gas refining industries, oil and gas production industries, and a stand-alone compressor without deviating from the scope of the present invention. The compressor 130 is explained in greater detail below.

During operation of the engine assembly 100, the fan assembly 108 compresses a fluid flow 158 entering the engine assembly 100 through the intake side 150. The fluid flow 158 exiting the fan assembly 108 is split such that a first portion 160 of the fluid flow 158 is channeled into the booster compressor 110, as a compressed fluid flow, and a second portion 162 of the fluid flow 158 bypasses the booster compressor 110 and the engine 112 and exits the engine assembly 100 via a bypass duct 164, through the fan exhaust side 156 as a bypass fluid flow. The plurality of rotor fan blades 124 is configured to compress and deliver the first portion 160 towards the engine 112. Furthermore, the compressed first portion 160 (i.e. fluid flow) is further compressed by the compressor 130 and is delivered to the downstream combustor 132. Moreover, the fluid flow 160 from the combustor 132 drives the rotating turbine 134 and the low-pressure turbine 114 and exits the engine assembly 100 through the engine exhaust side 146.

Figure 2:
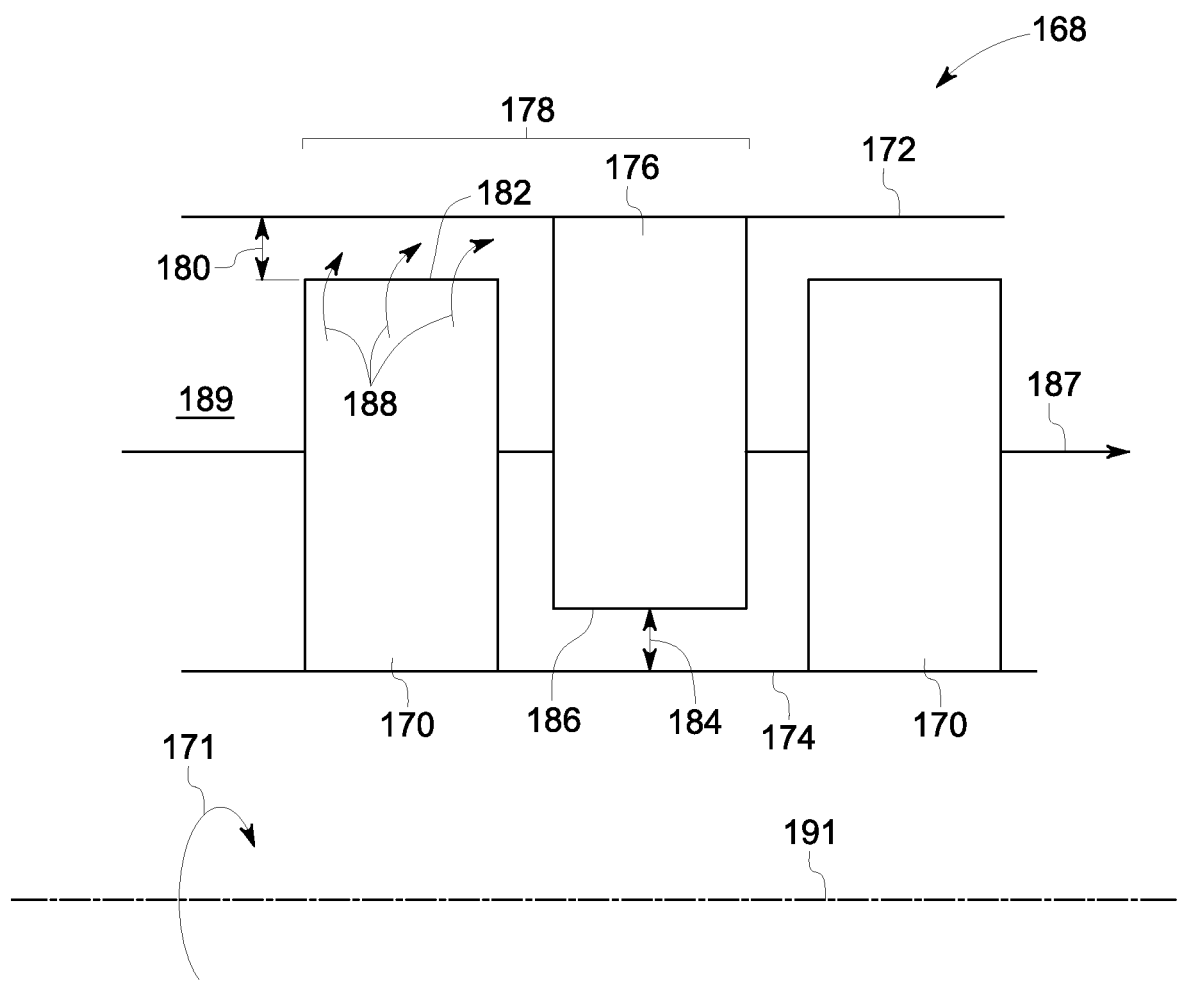
FIG. 2 is a schematic cross-sectional view of a portion of a compressor as known in art.

Referring now to FIG. 2, illustrated schematically is a portion 168 of a conventional compressor, as generally known in the art and labeled as "Prior Art". The portion 168 of the compressor includes a plurality of rotor blades 170 and a plurality of stator blades 176 (of which only a single stator blade is shown). Each rotor blade among the plurality of rotor blades 170 is circumferentially spaced around a compressor hub 174 and extends primarily in a radially outward direction (not labeled in FIG. 2) towards a compressor casing 172 from the compressor hub 174. Similarly, each stator blade among the plurality of stator blades 176 is circumferentially spaced around the compressor casing 172 and extends primarily in a radially inward direction (not labeled in FIG. 2) to interface with the compressor hub 174. Each stator blade 176 is positioned adjacent to each rotor blade 170, and in combination form one of a plurality of stages 178 (of which only a single stage is shown). The plurality of rotor blades 170 is circumscribed by the compressor casing 172, such that an annular gap 180 is defined between the compressor casing 172 and a tip 182 of each rotor blade 170. Likewise, the plurality of stator blades 176 is disposed relative to the compressor hub 174 such that an annular gap 184 is defined between the compressor hub 174 and a tip 186 of each stator blade 176.

During operation of such conventional compressor, fluid 187 flows along a flow path 189 as the rotor blades 170 rotates 171 along an axis 191. A stable operating range of such compressor is generally limited due to a leakage flow, as indicated by directional arrows 188, proximate to the tip 182 of each rotor blade 170. In addition, a leakage flow (not shown in FIG. 2) may appear proximate to the tip 186 of each stator blade 176. Such leakage flow 188 at the tip 182, 186 of the rotor and stator blades respectively may also affect a stall point of the compressor. To increase the operating range, conventional compressors may include flow-control systems (not shown in FIG. 2) such as plasma actuators, suction/blowing near the tip 182 of the rotor blades 170, in an attempt to provide an increase in the operating range by redirecting and/or minimizing leakage flow 188 and thereby improving the stall point/margin of the compressor.

Figure 3:
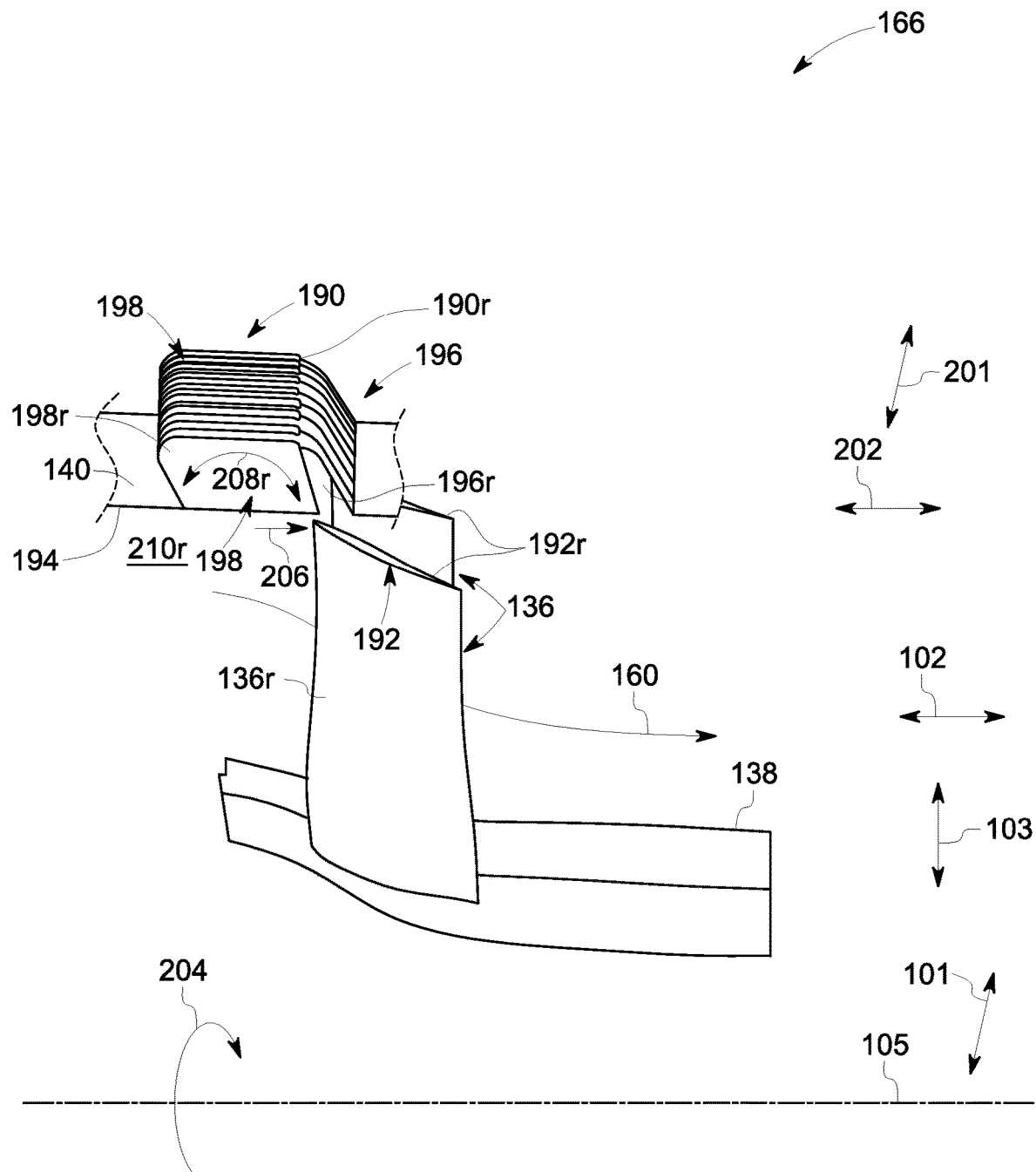
FIG. 3 is an isometric view of a portion of a compressor including an end-wall treatment formed in a casing of a compressor in accordance with one exemplary embodiment.

FIG. 3 illustrates an isometric view of a portion 166 of the compressor 130 having an end-wall treatment 190 formed in the casing 140 in accordance with one exemplary embodiment of the present invention. Similarly, the end-wall treatment 190 may be formed in the hub 138 of the compressor 130 which is explained in greater detail with respect to FIG. 4. The end-wall treatment 190 formed in the hub 138 and the casing 140 of the compressor 130 includes a first recess portion 196 and a plurality of second recess portions 198. Such end-wall treatment 190 may be formed continuously at all stages (not labeled in FIG. 3) in the casing 140 and hub 138. In some other embodiments, the end-wall treatment 190 may be formed selectively at one or more stages of the compressor 130. In the illustrated embodiment, the compressor 130 is an axial flow compressor. In certain other embodiments, suitable compressor 130 may include a centrifugal compressor, a reciprocating compressor, a screw compressor, a rotary compressor, and the like. The end-wall treatment 190 illustrated herein may be used in any such suitable compressor without deviating from the scope of the present invention.

In one embodiment, the end-wall treatment 190 faces a tip 192 of each blade 136. Specifically, in the illustrated embodiment, an end-wall treatment 190r faces a tip 192r of each rotor blade among a plurality of rotor blades 136r. As illustrated, in this particular embodiment, the end-wall treatment 190r is formed into an interior surface 194 of the casing 140 and disposed circumferentially thereabout proximate to the tip 192r of the plurality of rotor blades 136r. Such end-wall treatment 190r includes a first recess portion 196r extending along a first axis 201 and a plurality of second recess portions 198r extending along a second axis 202 different than the first axis 201. Each second recess portion among the plurality of second recess portions 198r is spaced apart from the adjacent second recess portion 198r, and extends from the first recess portion 196r along the second axis 202. The first recess portion 196r and at least a portion of the second recess portion 198r are configured to face the tip 192r of the rotor blade 136r. In one embodiment, the first axis 201 extends along a circumferential direction of the compressor 130 and the second axis 202 extends along an axial direction of the compressor 130. In certain other embodiments, the first recess portion 196r may extend along a circumference of the compressor 130 at about a predefined angle relative to an axial direction 102 of the compressor 130. In such embodiments, each second recess portion 198r may extend along the axial direction 102 of the compressor 130 in a first direction and/or a second direction opposite to the first direction (not labeled in FIG. 3) of the second axis 202. In certain other embodiments, each second recess portion 198r may extend along the circumference of the casing 140 at about a predefined angle relative to the axial direction 102 of the compressor 130. In such embodiments, the first recess portion 196r may extend along a circumferential direction 101 of the compressor 130.

During operation of the compressor 130, the tip 192r of each rotor blade 136r and the end-wall treatment 190r are configured to move relative to each other. Specifically, the hub 138 is configured to rotate 204 about the axial direction 102 so that a fluid flow 160 is generally along the principal direction (i.e. the longitudinal axis 105) of the engine assembly 100. Further, a portion 206 of the fluid 160 located at the tip 192r of each rotor blade 136r is recirculated as represented by reference numeral 208r via the recess portions 196r and 198r into a gap 210r formed between the tip 192r of each rotor blade 136r and the end-wall treatment 190r. This recirculation 208r of the fluid 160 effectively extracts low momentum flow (i.e. portion 206) present near the tip 192r of each rotor blade 136r, energizes the portion 206 of the fluid 160, and returns the energized flow (i.e. portion 206) into the gap 210r near each rotor blade 136r. The recirculation 208r of the portion 206 of the fluid 160 will be explained in a greater detail below.

Figure 4:
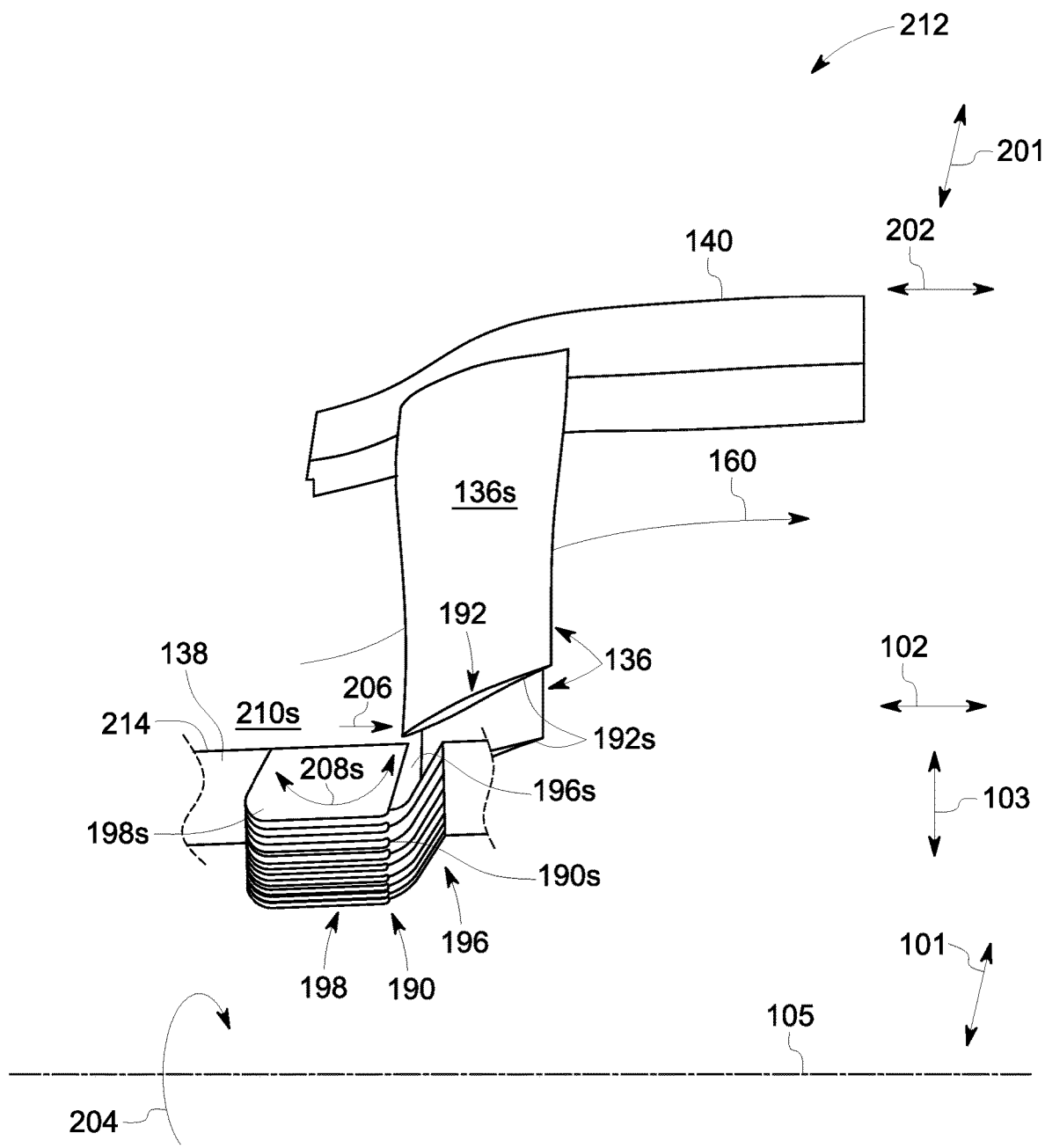
FIG. 4 is an isometric view of a portion of a compressor including an end-wall treatment formed in a hub of a compressor in accordance with one exemplary embodiment.

FIG. 4 illustrates an isometric view of another portion 212 of the compressor 130 having an end-wall treatment 190 formed in the hub 138 in accordance with one exemplary embodiment of the present invention.

In one embodiment, the end-wall treatment 190 faces a tip 192 of each blade 136. Specifically, in the illustrated embodiment, an end-wall treatment 190s faces a tip 192s of each stator blade among a plurality of stator blades 136s. As illustrated, in this particular embodiment, the end-wall treatment 190s is formed into an interior surface 214 of the hub 138 and disposed circumferentially thereabout proximate to the tip 192s of the plurality of stator blades 136s. Such end-wall treatment 190s includes a first recess portion 196s extending along a first axis 201 and a plurality of second recess portions 198s extending along a second axis 202 different than the first axis 201. Each second recess portion among the plurality of second recess portions 198s is spaced apart from the adjacent second recess portion 198s, and extends from the first recess portion 196s along the second axis 202. The first recess portion 196s and at least a portion of the second recess portion 198s are configured to face the tip 192s of the stator blade 136s. Similar to the embodiment shown in FIG. 3, the first axis 201 extends along a circumferential direction of the compressor 130 and the second axis 202 extends along an axial direction of the compressor 130. In certain other embodiments, the first recess portion 196s may extend along the circumference of the compressor 130 at about a predefined angle relative to the axial direction 102 of the compressor 130. In such embodiments, each second recess portion 198s may extend along the axial direction 102 of the compressor 130 in a first direction and/or a second direction opposite to the first direction (not labeled in FIG. 3) of the second axis 202. In certain other embodiments, each second recess portion 198s may extend along the circumference of the casing 140 at about a predefined angle relative to the axial direction 102 of the compressor 130. In such embodiments, the first recess portion 196s may extend along the circumferential direction 101 of the compressor 130.

During operation of the compressor 130, the tip 192s of each stator blade 136s and the end-wall treatment 190s are configured to move relative to each other. Specifically, the hub 138 is configured to rotate 204 about the axial direction 102 so that the fluid flow 160 is generally along the principal direction (i.e. the longitudinal axis 105) of the engine assembly 100. Further, the portion 206 of the fluid 160 located at the tip 192s of each stator blade 136s is recirculated as represented by reference numeral 208s via the recess portions 196s and 198s into a gap 210s formed between the tip 192s of each stator blade 136s and the end-wall treatment 190s. This recirculation 208s of the fluid 160 effectively extracts low momentum flow (i.e. portion 206) present near the tip 192s of each stator blade 136s, energizes the portion 206 of the fluid 160, and returns the energized flow (i.e. portion 206) into the gap 210s near each stator blade 136s. The recirculation 208s of the portion 206 of the fluid 160 will be explained in a greater detail below.

In certain other embodiments, the end-wall treatment 190 may be formed separately and may be coupled to the casing 140 and the hub 138 without deviating from the scope of the present invention.

Figure 5:
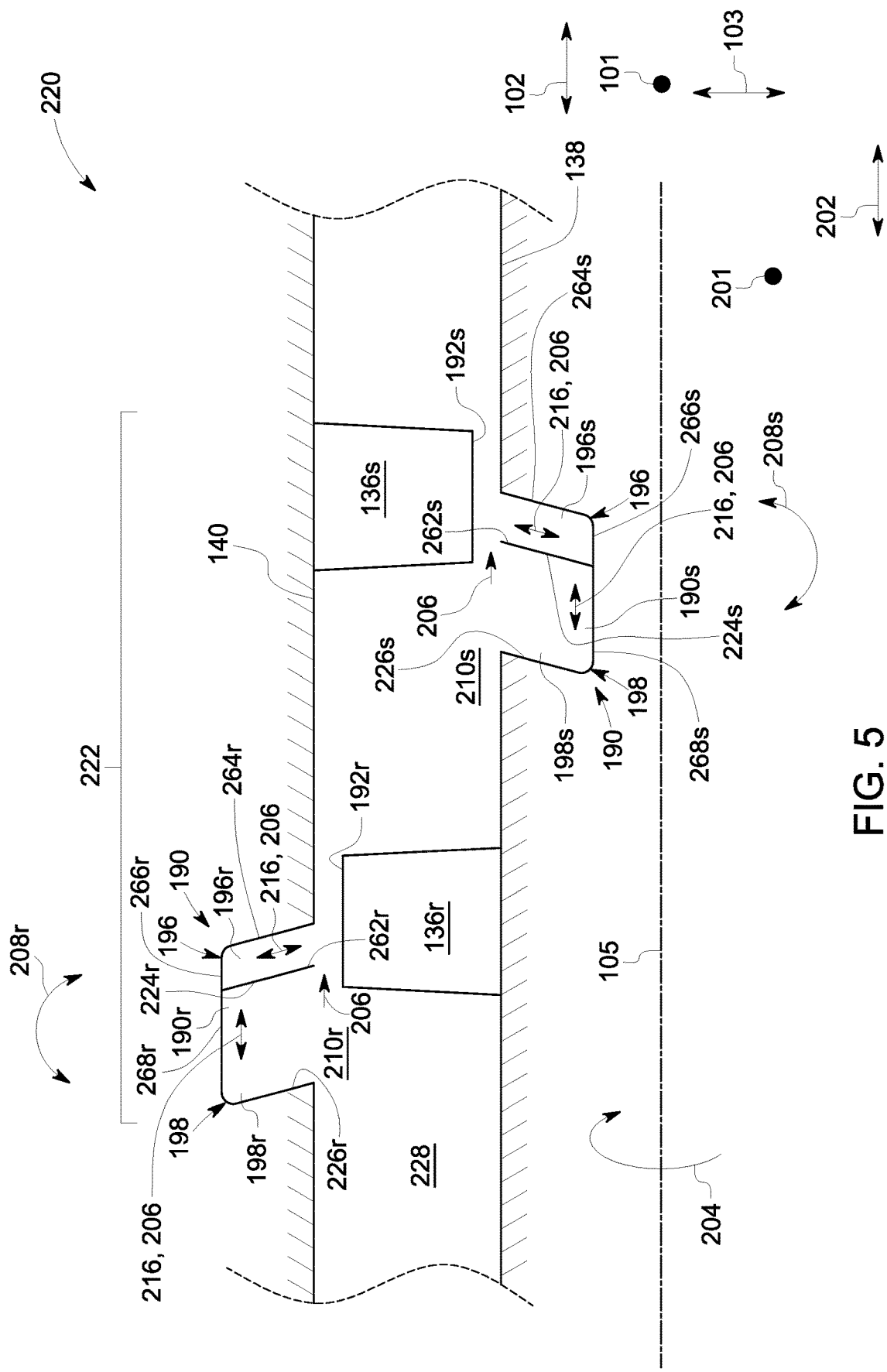
FIG. 5 is a schematic cross-sectional view of a portion of the compressor including the end-wall treatment in accordance with the exemplary embodiments of FIGS. 3 and 4.

FIG. 5 is a schematic view of yet another portion 220 of the compressor 130 including the end-wall treatment 190 in accordance with the exemplary embodiments of FIGS. 3 and 4. Specifically, the schematic view in FIG. 5 is along the axial-radial plane of the compressor 130. In the illustrated embodiment, a circumferential direction of the compressor 130 is represented by reference numeral 101, an axial direction of the compressor 130 is represented by reference numeral 102, and a radial direction of the compressor 130 is represented by reference numeral 103. The portion 220 shown in FIG. 5 illustrates one stage 222 among the plurality of stages (not shown in FIG. 5) of the compressor 130. The stage 222 includes the end-wall treatment 190 disposed in the casing 140 and the hub 138. Specifically, the end-wall treatment 190r is disposed in the casing 140 and the end-wall treatment 190s is disposed in the hub 138. As discussed in the embodiment shown in FIGS. 3 and 4, the end-wall treatment 190 includes the first recess portion 196 and the plurality of second recess portions 198 (off which only one second recess portion is shown in FIG. 5). Specifically, the end-wall treatment 190r includes the first recess portion 196r disposed along the first axis 201 and the second recess portion 198r extending from the first recess portion 196r along the second axis 202. Similarly, the end-wall treatment 190s includes the first recess portion 196s disposed along the first axis 201 and the second recess portion 198s extending from the first recess portion 196s along the second axis 202.

Each second recess portion 198r includes a downstream wall 224r, an upstream wall 226r, and an outer wall 268r disposed between the downstream wall 224r and the upstream wall 226r. Similarly, each second recess portion 198s includes a downstream wall 224s, an upstream wall 226s, and an outer wall 268s disposed between the downstream wall 224s and the upstream wall 226s. Each first recess portion 196r includes a downstream wall 264r, an upstream wall 262r, and an outer wall 266r disposed between the downstream wall 264r and the upstream wall 262r. Similarly, each second recess portion 198s includes a downstream wall 264s, an upstream wall 262s, and an outer wall 266s disposed between the downstream wall 264s and the upstream wall 262s. The downstream wall 224r and the upstream wall 262r are integrated to each other. Similarly, the downstream wall 224s and the upstream wall 262s are integrated to each other. The position of the recess portions 196 and 198, orientation, cross-section definition and additional geometrical parameters may be optimized to provide specific solution for any application that desires an increase in stable operating range, which is explained in greater detail below.

During operation of the compressor 130, the tips 192r and 192s of each rotor and stator blades 136r and 136s respectively, and the end-wall treatments 190r and 190s are configured to move relative to each other. The end-wall treatment 190 is configured for recirculating 208r and 208s the portion 206 of the fluid flow 160 into the gaps 210r and 210s with minimal effect on efficiency penalty of the compressor 130. In one embodiment, when the hub 138 of the compressor 130 rotates, the fluid flow 160 (as shown in FIGS. 3 and 4) from the booster compressor 110 (as shown in FIG. 1) enters a flow path 228 formed between the hub 138 and the casing 140. The portion 206 of the fluid 160 at the tips 192r and 192s of the rotor and stator blades 136r and 136s respectively is extracted into recess portions 196 and 198. The portion 206 extracted into the first recess portion 196 flows along the first axis 201 to maintain the flow substantially straight through the first recess portion 196. Similarly, the portion 206 extracted into the plurality of second recess portions 198 flows along the second axis 202 to maintain the flow substantially straight through the plurality of second recess portions 198. In such embodiment, a sub-portion 216 of the portion 206 of the fluid 160 is redistributed from the first recess portion 196 into the plurality of second recess portions 198 and the sub-portion 216 of the portion 206 of the fluid 160 is redistributed from the plurality of second recess portions 198 into the first recess portion 196. Finally, the portion 206 and the sub-portion 216 of the fluid 160 are recirculated into the gaps 210r and 210s formed between the tips 192r and 192s of each blade 136 and the end-wall treatment 190.

Figure 6:
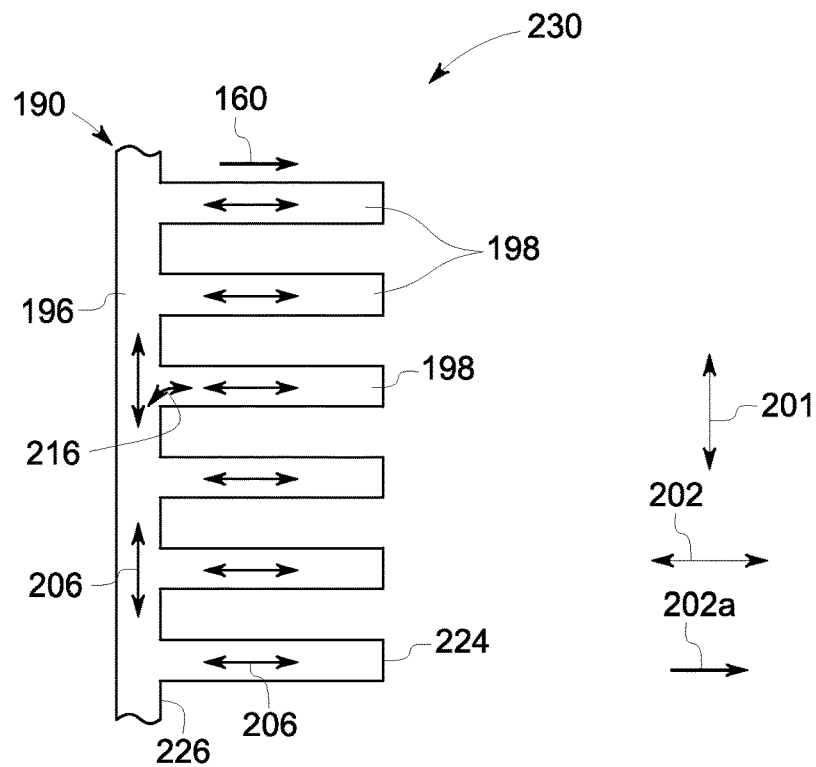
FIG. 6 is a schematic diagram of a portion of an end-wall treatment in accordance with one exemplary embodiment.

FIG. 6 is a schematic diagram of a portion 230 of the end-wall treatment 190 in accordance with one exemplary embodiment of the present invention. The schematic diagram represents the portion 230 along the radial direction 103 (as shown in FIG. 5) of the compressor 130. It should be noted herein that the portion 230 is shown in the form of an open strip for illustration and explanation purposes. In one or more embodiments, the end-wall treatment 190 may be formed in the casing 140 and the hub 138 (as shown in FIGS. 3, 4, and 5).

The end-wall treatment 190 includes the first recess portion 196 and the plurality of second recess portions 198. The first recess portion 196 extends along the first axis 201 to maintain the portion 206 of the fluid flow 160 substantially straight through the first recess portion 196. The plurality of second recess portions 198 spaced apart from each other and extends from the first recess portion 196 along a first direction 202a of the second axis 202 different than the first axis 201 to maintain the portion 206 of the fluid flow 160 substantially straight through the plurality of second recess portions 198. Each second recess portion 198 has an upstream wall 226 and a downstream wall 224. In the illustrated embodiment, the upstream wall 226 of each second recess portion 198 is integrated to the first recess portion 196. Further, the sub-portion 216 of the portion 206 is exchanged between the first recess portion 196 and the upstream wall 226 of the second recess portion 198. The portion 206 and the sub-portion 216 of the fluid flow 160 are recirculated into the gaps 210r and 210s (as shown in FIGS. 3, 4, and 5) from the downstream wall 224 of each second recess portion 198 and the first recess portion 196. This exchange of the sub-portion 216 of the fluid flow 160 allows improved recirculation 208r and 208s of low momentum flows 206 and 216 extracted near the tip 192r and 192s of each rotor and stator blades 136r and 136s.

Figure 7:
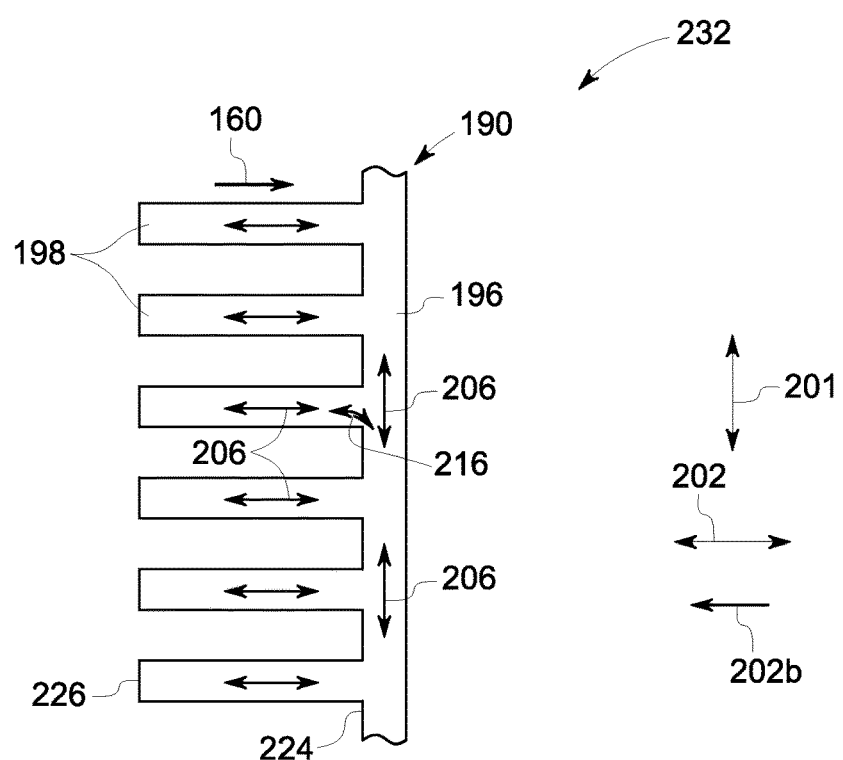
FIG. 7 is a schematic diagram of a portion of an end-wall treatment in accordance with another exemplary embodiment.

FIG. 7 is a schematic diagram of a portion 232 of the end-wall treatment 190 in accordance with another exemplary embodiment of the present invention. The schematic diagram represents the portion 232 along the radial direction 103 (as shown in FIG. 5) of the compressor 130. It should be noted herein that the portion 232 is shown in the form of an open strip for illustration and explanation purposes. The first recess portion 196 extends along the first axis 201 and the plurality of second recess portions 198 extends from the first recess portion 196 along a second direction 202b of the second axis 202 different than the first axis 201. In the illustrated embodiment, the downstream wall 224 of each second recess portion 198 is integrated to the first recess portion 196. Further, the sub-portion 216 of the fluid flow 160 is exchanged between the first recess portion 196 and the downstream wall 224 of each second recess portion 198. The portion 206 and the sub-portion 216 of the fluid flow 160 are recirculated into the gaps 210r and 210s (as shown in FIGS. 3, 4 and 5) from the upstream wall 226 of the second recess portion 198 and first recess portion 196.

Figure 8:
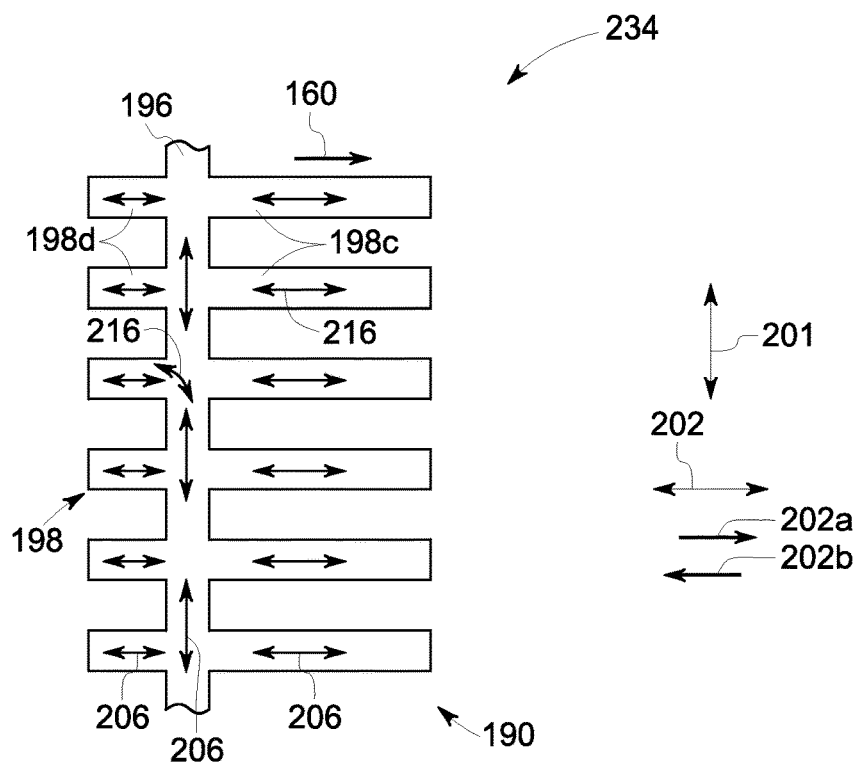
FIG. 8 is a schematic diagram of a portion of an end-wall treatment in accordance with yet another exemplary embodiment.

FIG. 8 is a schematic diagram of a portion 234 of the end-wall treatment 190 in accordance with yet another exemplary embodiment of the present invention. The schematic diagram represents the portion 234 along the radial direction 103 (as shown in FIG. 5) of the compressor 130. It should be noted herein that the portion 234 is shown in the form of an open strip for illustration and explanation purposes. The first recess portion 196 extends along the first axis 201 and the plurality of second recess portions 198 extends from the first recess portion 196 along the second axis 202 different than the first axis 201. Specifically, in the illustrated embodiment, the plurality of second recess portions 198 includes a first set of recess portions 198c extending along the first direction 202a of the second axis 202, and a second set of recess portions 198d extending along the second direction 202b opposite to the first direction 202a, of the second axis 202. In such embodiments, the plurality of second recess portions 198 maintains the portion 206 of the fluid flow 160 substantially straight through each second recess portion 198 along the second axis 202. Further, the sub-portion 216 of the portion 206 is exchanged between the first recess portion 196 and the plurality of second recess portions 198 in both first and second directions 202a and 202b. The portion 206 and the sub-portion 216 of the fluid flow 160 are later recirculated into the gaps 210r and 210s (as shown in FIGS. 3, 4 and 5).

Figure 9:
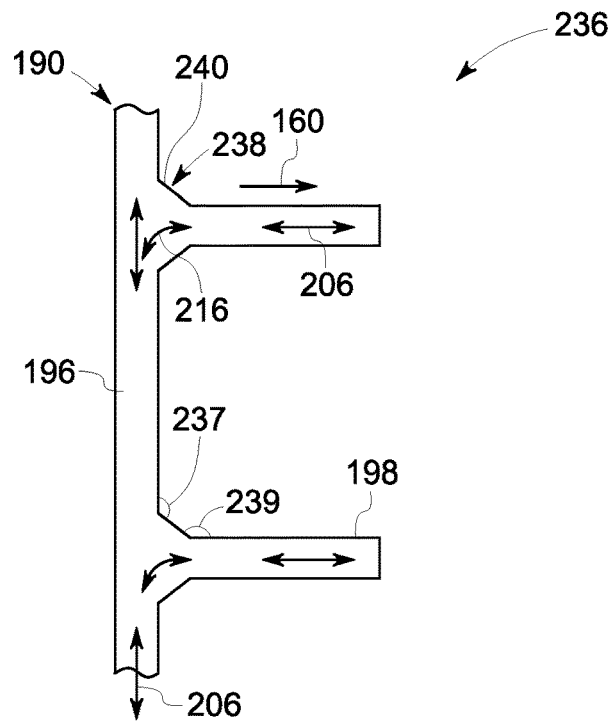
FIG. 9 is a schematic diagram of a portion of an end-wall treatment in accordance with yet another exemplary embodiment.

FIG. 9 is a schematic diagram of a portion 236 of the end-wall treatment 190 in accordance with yet another exemplary embodiment of the present invention. The schematic diagram represents the portion 236 along the radial direction 103 (as shown in FIG. 5) of the compressor 130. It should be noted herein that the portion 236 is shown in the form of an open strip for illustration and explanation purposes. The end-wall treatment 190 further includes a joining portion 238 extending from the first recess portion 196 to each second recess portion 198. The joining portion 238 includes a wall 240 which subtends at a predefined angle 237 relative to the first recess portion 196 and at a predefined angle 239 relative to each second recess portion 198. In one embodiment the predefined angle 237 is in a range from about 20 degrees to about 200 degrees and the predefined angle 239 is in a range from about 20 degrees to about 200 degrees. The joining portion 238 may be in a form of curve, arc and the like. Such joining portion 238 of the present invention provides a smooth fluid flow region for the sub-portion 216 to exchange between the first recess portion 196 and each second recess portion 198.

Figure 10:
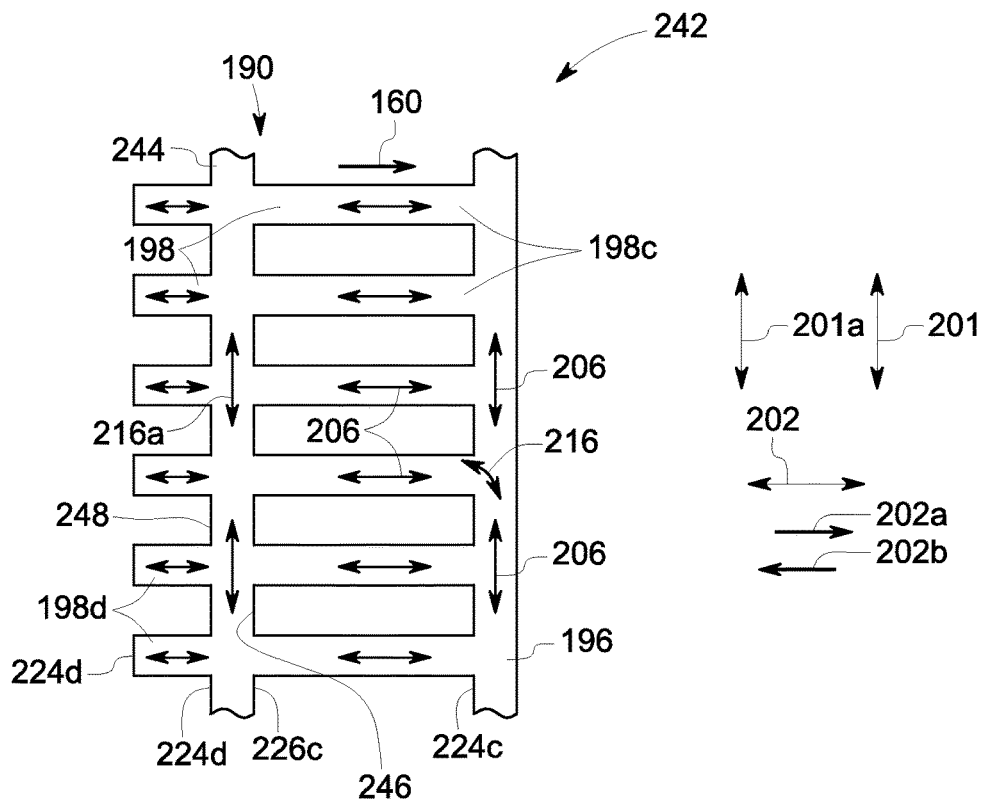
FIG. 10 is a schematic diagram of a portion of an end-wall treatment in accordance with yet another exemplary embodiment.

FIG. 10 is a schematic diagram of a portion 242 of the end-wall treatment 190 in accordance with yet another exemplary embodiment. The schematic diagram represents the portion 242 along the radial direction 103 (as shown in FIG. 5) of the compressor 130. In the illustrated embodiment, the end-wall treatment 190 includes the first recess portion 196, the plurality of second recess portions 198, and a third recess portion 244. The first recess portion 196 extends along the first axis 201 and the third recess portion 244 extends along the third axis 201a. In the illustrated embodiment, the first axis 201 and the third axis 201a extends along the same direction. In some other embodiments, the third axis 201a may extend along the circumference of the compressor 130 (as shown in FIG. 5) at about a predefined angle relative to the axial direction 102 (as shown in FIG. 5) of the compressor 130. In one or more embodiments, the orientation of the third recess portion 244 along the third axis 201a may vary depending on the application and design criteria, and should not be construed as a limitation of the present invention. The plurality of second recess portions 198 includes the first set of recess portions 198c extending along the first direction 202a of the second axis 202, and the second set of recess portions 198d extending along the second direction 202b opposite to the first direction 202a, of the second axis 202. In the illustrated embodiment, a downstream wall 224c of each second recess portion among the first set of recess portions 198c is coupled to the first recess portion 196 and an upstream wall 226c of each recess portion among the first set of recess portions 198c is coupled to a downstream wall 246 of the third recess portion 244. Similarly, a downstream wall 224d of each second recess portion among the second set of recess portions 198d is coupled to an upstream wall 248 of the third recess portion 244.

In such embodiments, the portion 206 of the fluid flow 160 is extracted into the first recess portion 196 and the first set of recess portions 198c. The portion 206 extracted into the first recess portion 196 flows along the first axis 201 to maintain the flow substantially straight through the first recess portion 196. Similarly, the portion 206 extracted into the first set of recess portions 198c flows along the second axis 202 from the downstream wall 224c to the upstream wall 226c to maintain the flow substantially straight through the plurality of second recess portions 198. In such embodiment, the sub-portion 216 is redistributed from the first recess portion 196 into the downstream wall 224c of the first set of recess portions 198c. Further, another sub-portion 216a from the first set of recess portion 198c may flow into the third recess portion 244 so as to redistribute the other sub-portion 216a into the second set of recess portions 198d. Finally, the portion 206, the sub-portion 216, and the other sub-portion 216a may be recirculated from the second and third recess portions 198 and 244 into the gaps 210r and 210s (as shown in FIGS. 3, 4, and 5).

Figure 11:
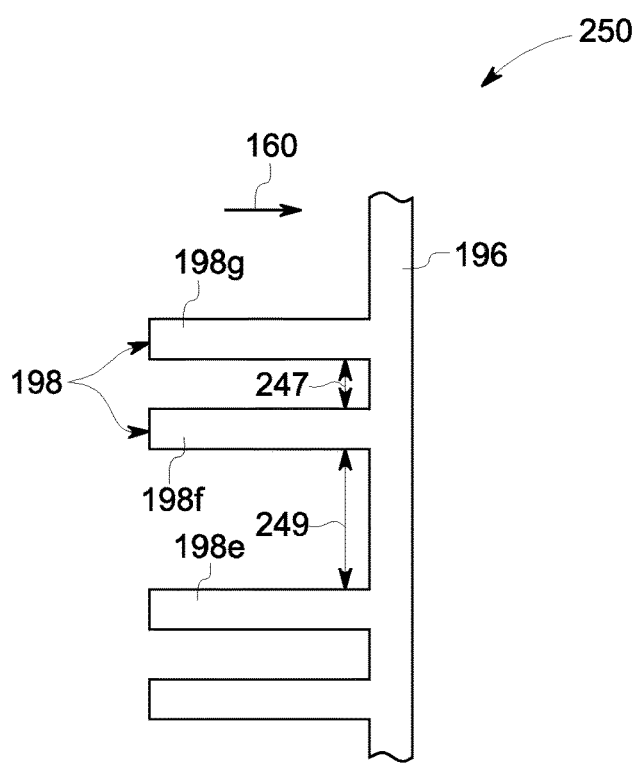
FIG. 11 is a schematic diagram of a portion of an end-wall treatment in accordance with yet another exemplary embodiment.

FIG. 11 is a schematic diagram of a portion 250 of an end-wall treatment 190 in accordance with yet another exemplary embodiment of the present invention. The schematic diagram represents the portion 250 along the radial direction 103 (as shown in FIG. 5) of the compressor 130. In the illustrated embodiment, the plurality of second recess portions 198 is not equally spaced apart from each other. A second recess portion 198e and a second recess portion 198f are spaced apart from each other by a length 247. Similarly, the second recess portion 198f and a second recess portion 198g are spaced apart from each other by a distance 249 different than the distance 247. The distance 247 and 249 between each second recess portion 198 may help in varying quantity and frequency of the recirculation fluid 208r and 208s (as shown in FIGS. 3, 4 and 5) being injected into the gaps 210r and 210s (as shown in FIGS. 3, 4, and 5).

Figure 12:
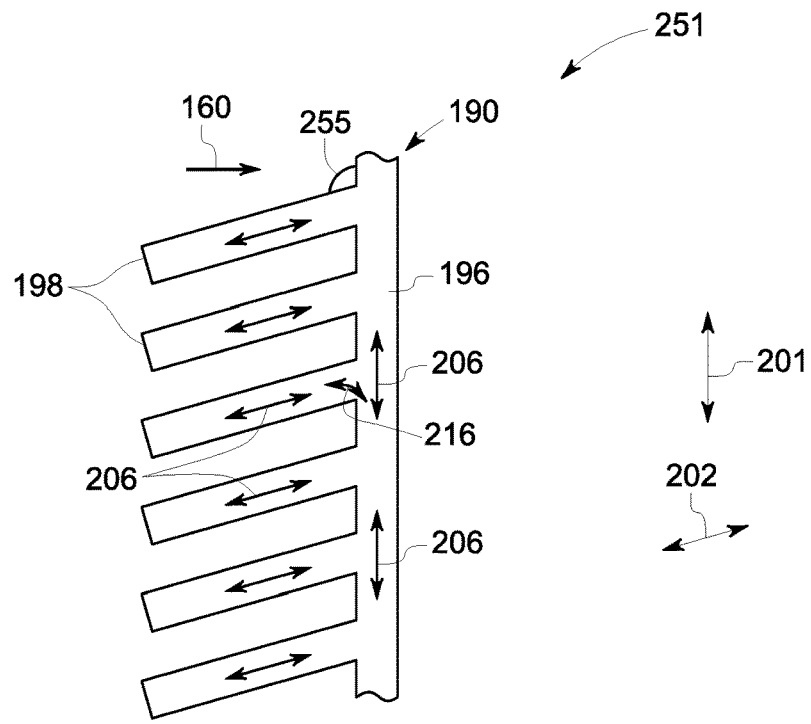
FIG. 12 is a schematic diagram of a portion of an end-wall treatment in accordance with yet another exemplary embodiment.

FIG. 12 is a schematic diagram of a portion 251 of an end-wall treatment 190 in accordance with yet another exemplary embodiment of the present invention. The schematic diagram represents the portion 251 along the radial direction 103 (as shown in FIG. 5) of the compressor 130. In the illustrated embodiment, the plurality of second recess portions 198 extends along the second axis 202 from the first recess portion 196 at an inclined angle 255 relative to the circumferential direction 101 of the compressor 130. Each second recess portion 198 inclining at the angle 255 may help in varying quantity and frequency of the recirculation fluid 208r and 208s (as shown in FIGS. 3, 4 and 5) being injected into the gaps 210r and 210s (as shown in FIGS. 3, 4, and 5).

Figure 13:
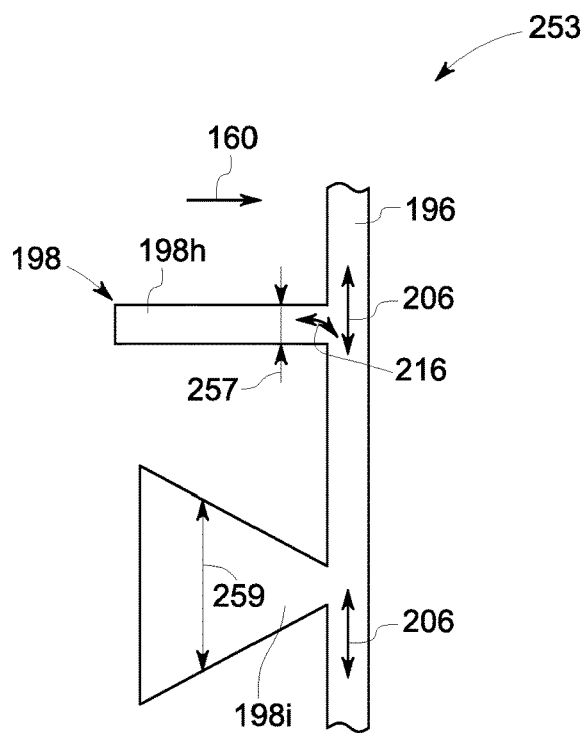
FIG. 13 is a schematic diagram of a portion of an end-wall treatment in accordance with yet another exemplary embodiment.

FIG. 13 is a schematic diagram of a portion 253 of an end-wall treatment 190 in accordance with yet another exemplary embodiment of the present invention. The schematic diagram represents the portion 253 along the radial direction 103 (as shown in FIG. 5) of the compressor 130. In the illustrated embodiment, the plurality of second recess portions 198 does not have equal width. A second recess portion 198h has a width 257 and a second recess portion 198i has a width 259 different than the width 257. Specifically, the width 259 varies along the length of the second recess portion 198i. The second recess portion 198i having varying width 259 may help in varying the quantity of the recirculation fluid 208r and 208s (as shown in FIGS. 3, 4 and 5) being injected into the gaps 210r and 210s (as shown in FIGS. 3, 4, and 5).

Figure 14:
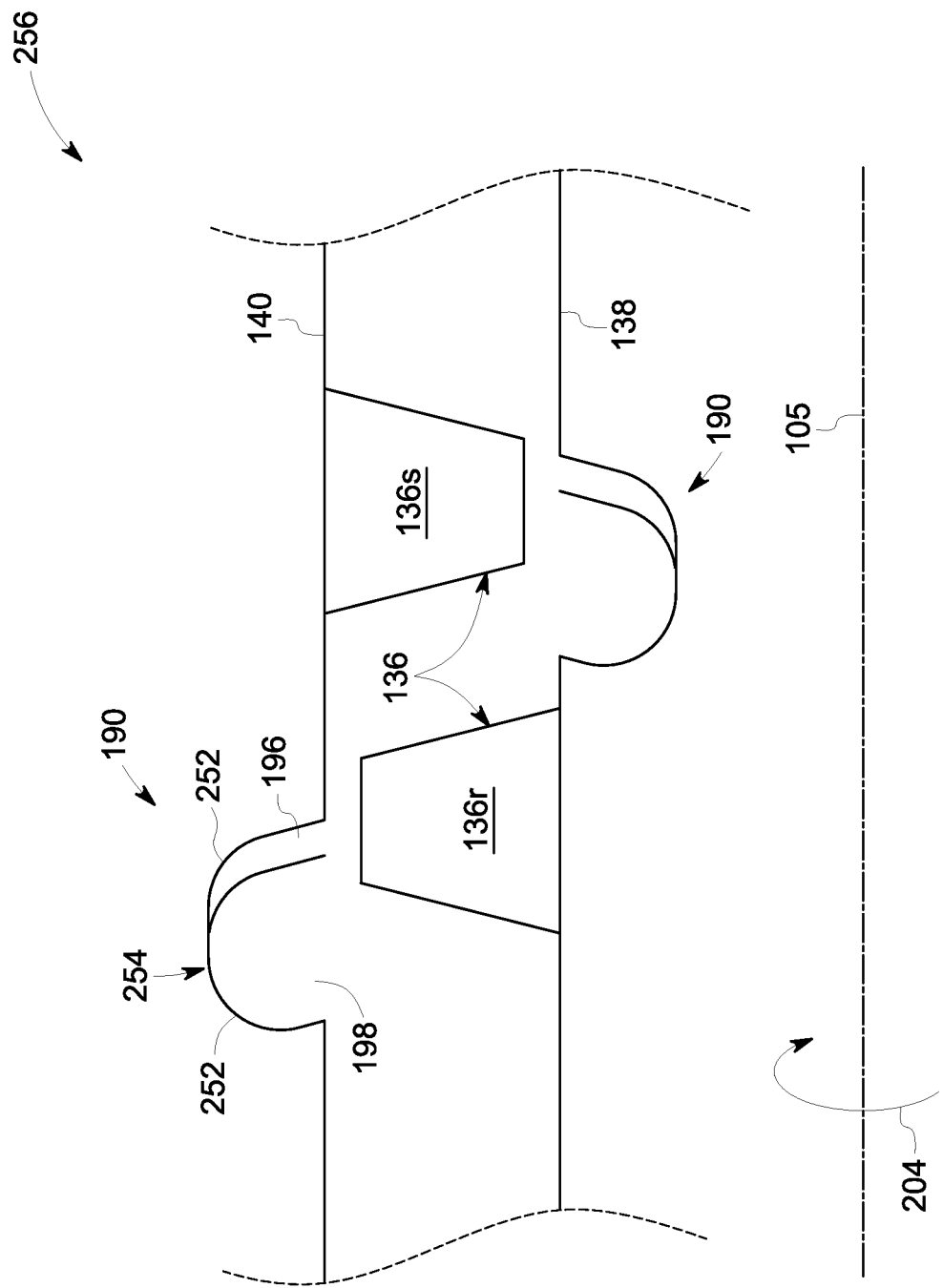
FIG. 14 is a schematic cross-sectional view of a portion of a compressor including an end-wall treatment in accordance with one exemplary embodiment.

FIG. 14 is a schematic cross-sectional view of a portion 256 of the compressor 130 including the end-wall treatment 190 in accordance with one exemplary embodiment. The schematic cross-sectional view represents the portion 256 along the axial-radial direction (as shown in FIG. 5) of the compressor 130. In the illustrated embodiment, the end-wall treatment 190 includes a smooth profile 252 such as an arc at an outer wall portion 254 of the first recess portion 196 and each second recess portion 198. In certain other embodiments, the profile 252 may vary depending on the application and design criteria. The smooth profile 252 provides a smooth fluid flow region for the portion 206 and sub-portion 216 to flow from the first recess portion 196 and each second recess portion 198 into the gaps 210r and 210s (as shown in FIGS. 3, 4, and 5).

Figure 15:
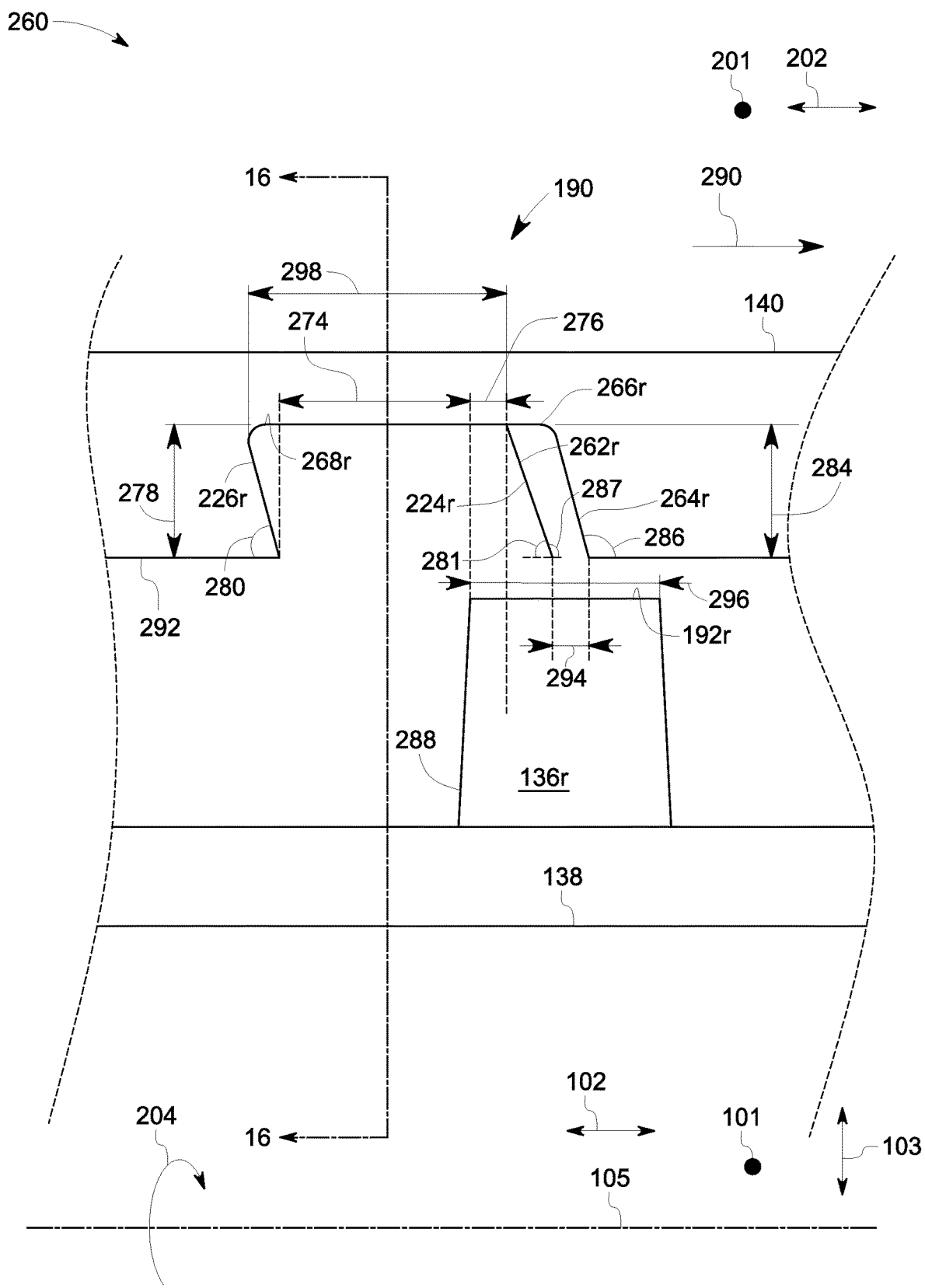
FIG. 15 is a schematic cross-sectional view of a portion of a compressor including an end-wall treatment in accordance with one or more embodiments shown or described herein.

FIG. 15 is a schematic cross-sectional view of the portion 260 of the compressor 130 including the end-wall treatment 190 in accordance with one exemplary embodiment of the present invention. The schematic cross-sectional view represents the portion 260 along the axial-radial direction (as shown in FIG. 5) of the compressor 130. In this particular embodiment, the end-wall treatment 190 is shown as embedded in the casing 140 and hub 138.

The end-wall treatment 190 embedded in the casing 140 is considered for explanation of various geometrical features in the end-wall treatment 190 and should not be construed as a limitation of the present invention. The geometrical features of the end-wall treatment 190r explained herein with respect to the casing 140 may be applied to the end-wall treatment 190s formed in the hub 138. The end-wall treatment 190 having the first recess portion 196 and the plurality of second recess portions 198 are disposed relative to the plurality of rotor blades 136r, and more particularly to the tip 192r of the each rotor blade 136r. Similar to the previously described embodiments, the first recess portion 196 is defined by the upstream wall 262r, the downstream wall 264r, and the outer wall 266r disposed between the upstream wall 262r and the downstream wall 264r. Similarly, each second recess portion 198 is defined by the upstream wall 226r, the downstream wall 224r, and the outer wall 268r disposed between the upstream wall 226r and the downstream wall 224r. In the illustrated embodiment, the upstream wall 262r of the first recess portion 196 and the downstream wall 224r of each second recess portion 198 may be integrated at certain intervals as illustrated in FIGS. 6-11.

Figure 16:
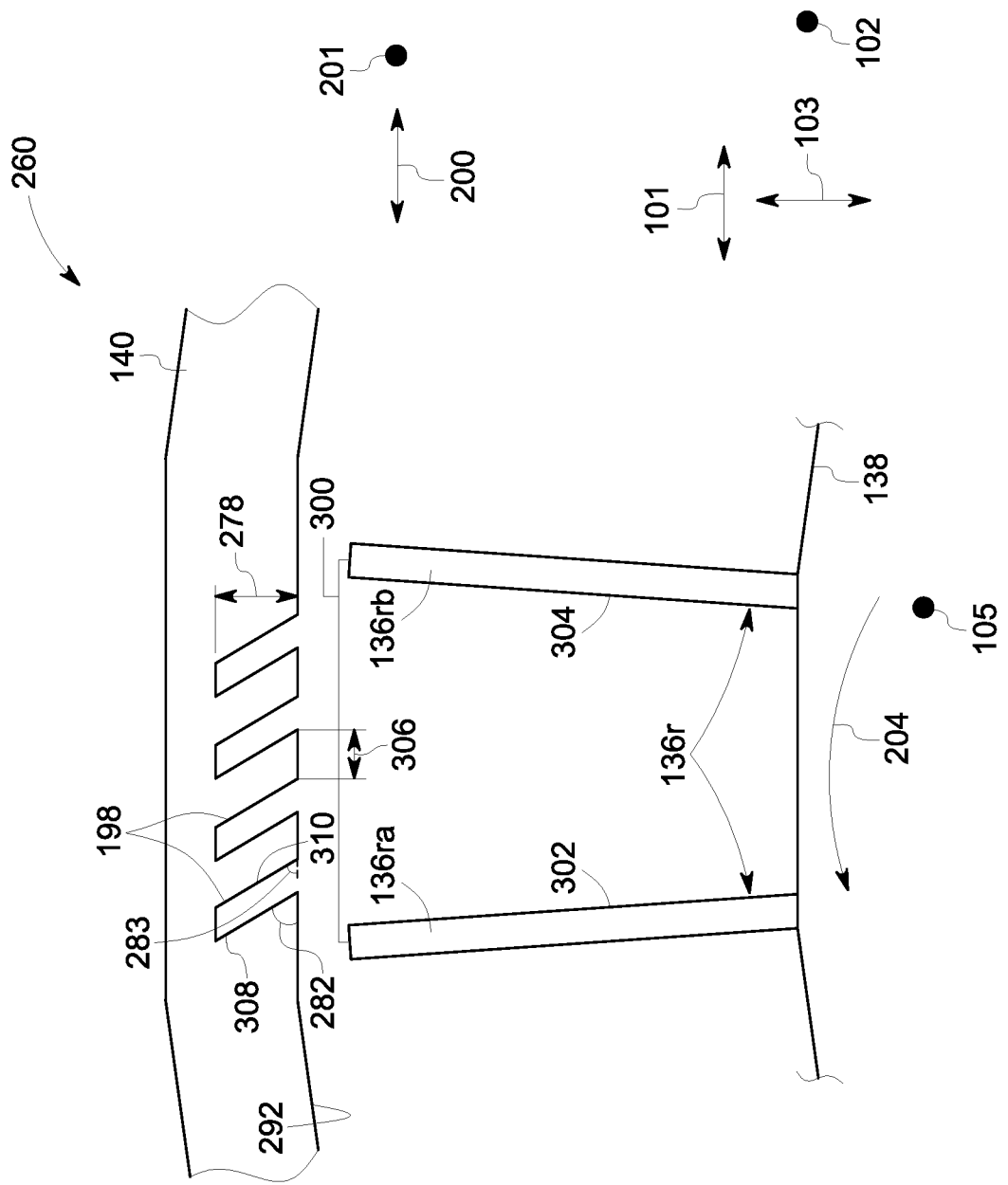
FIG. 16 is a schematic cross-section view of the portion of the compressor of FIG. 15, including the end-wall treatment in accordance with one or more exemplary embodiments.

Each second recess portion 198 is further defined by an exposure portion 276 (i.e. overlapping portion), a height 278 (i.e. radial height), an axial lean 280 of the upstream wall 226r, an axial lean 281 of the downstream wall 224r, and a tangential lean 282 and 283 (as shown in FIG. 16). Each second recess portion 198 in certain other embodiments (including the embodiment illustrated in FIG. 14) has an overhanging portion 274. The first recess portion 196 is further defined by a height 284 (i.e. radial height) and an axial lean 287 of the upstream wall 262r and an axial lean 286 of the downstream wall 264r. In the illustrated embodiment, the radial heights 278 and 284 are substantially same. In certain other embodiments, the radial heights 278 and 284 may vary according to the application and design criteria.

As best illustrated in FIG. 14, the overhanging portion 274 extends upstream of the rotor blade 136r and more particularly extends in-line with a forward edge 288 of the rotor blade 136r to the upstream wall 226r. The overlapping region 276 extends from the forward edge 288 of the rotor blade 136r in a downstream direction 290 up to the rear wall 270 of each second recess portion 198, thereby essentially overlapping a portion of the rotor blade 136r.

In the illustrated embodiment, the upstream wall 226r and the downstream wall 224r of each second recess portion 198 are inclined at an angle, referred to as the axial lean 280 and 281 respectively with respect to a surface 292 of the casing 140. In one embodiment, the axial leans 280 and 281 of the upstream wall 226r and the downstream wall 224r respectively may be equal. In certain other embodiments, the axial leans 280 and 281 of the upstream wall 226r and the downstream wall 224r respectively may not be equal. In the illustrated embodiment, the axial lean 280 of the upstream wall 226r may be designed to minimize flow losses arising when portion 206 of the fluid flow 160 is being recirculated into the gaps 210r and 210s. In the illustrated embodiment, the axial lean 281 of the downstream wall 224r may be designed to minimize flow losses arising when the portion 206 and sub-portion 216 of the fluid flow 160 is being exchanged with the plurality of second recess portions 198 of the end-wall treatment 190.

The first recess portion 196 has a width 294 along the axial direction 102 of the compressor 130. The upstream wall 262r and the downstream wall 264r are inclined at an angle, referred to as the axial leans 287 and 286 respectively, with respect to the surface 292 of the casing 140. In one embodiment, the axial leans 286, and 287 of the upstream wall 262r and the downstream wall 264r respectively may be equal. In certain other embodiments, the axial leans 286 and 287 of the downstream wall 264r and the upstream wall 262r respectively may not be equal. In the illustrated embodiment, the axial lean 287 of the upstream wall 262r may be designed to minimize flow losses when the portion 206 and sub-portion 216 of the fluid flow 160 is being exchanged with the plurality of second recess portions 198 of the end-wall treatment 190. In the illustrated embodiment, the axial lean 286 of the downstream wall 264r may be designed to minimize flow losses arising when the portion 206 is being extracted from the fluid flow 160. In the embodiments illustrated above, the axial leans 280, 281, 286, and 287 are along the axial direction 102 of the compressor 130 relative to the surface 292 of the casing 130 at which the end-wall treatment 190 is formed or embedded in the compressor 130 hardware.

In one embodiment, the radial height 284 of the first recess portion 196 is at about less than 75% of an axial chord length 296 of the tip 192r of the rotor blade 136r. Similarly, radial height 278 of each second recess portion is less than 75% of the axial chord length 296 of the tip 192r of the rotor blade 136r. The width 294 of first recess portion 196 is at about less than 50 percent of the axial chord length 296 of the rotor blade tip 192r. The overhanging region 274 is less than 60 percent of the chord length 296 of each rotor blade tip 192r. The overlapping region 276 is in a range from about 5 percent to about 95 percent of the axial chord length 296 of each rotor blade 198. The axial lean 280 and 281 of each second recess portion 198 is a range from about 5 degrees to 175 degrees relative to the surface 292 of the casing 130 at which the end-wall treatment 190 is formed. Similarly, axial lean 286 and 287 of the first recess portion 196 is a range from about 5 degrees to 175 degrees relative to the surface 292 of the casing 130 at which the end-wall treatment 190 is formed.

FIG. 16 is a schematic cross-section view of the portion 260 of the compressor taken along view 16-16 of FIG. 15 including the end-wall treatment 190 embedded in the casing 140 in accordance with one or more exemplary embodiments. Specifically, the schematic cross-sectional view of the portion 260 is aft looking forward view along the axis (i.e. the longitudinal axis 105) of rotation 204.

In one embodiment, a blade passage 300 (of which only one is illustrated) is defined between adjacent rotor blades 136r, and more particularly between a suction side 302 of a first blade 136ra and pressure side 304 of an adjacently positioned second blade 136rb. In one embodiment, the spacing of the plurality of second recess portions 198 circumferentially about the casing 140 is approximately about 1 to 16 slots per blade passage 300, as best illustrated in FIG. 15.

Each second recess portion 198 is further defined by a first sidewall 308 and a second sidewall 310. Generally similar to the axial lean 280, the first sidewall 308 and the second sidewall 310 of each second recess portion 198 is inclined at an angle to define the tangential leans 282 and 283, with respect to the surface 292 in the casing of the end-wall treatment 190. Specifically, the tangential leans 282 and 283 is along the circumferential direction 101 of the compressor 130 and is in a range from about 5 degrees to about 175 degrees relative to the surface 292 of the casing 140 at which the end-wall treatment 190 is formed. In one embodiment, the tangential lean 282 of first sidewall 308 and tangential lean 283 of the second sidewall 310 may be equal. In certain other embodiments, the tangential lean 282 of the first sidewall 308 and the tangential lean 283 of the second sidewall 310 may not be equal.

Figure 17:
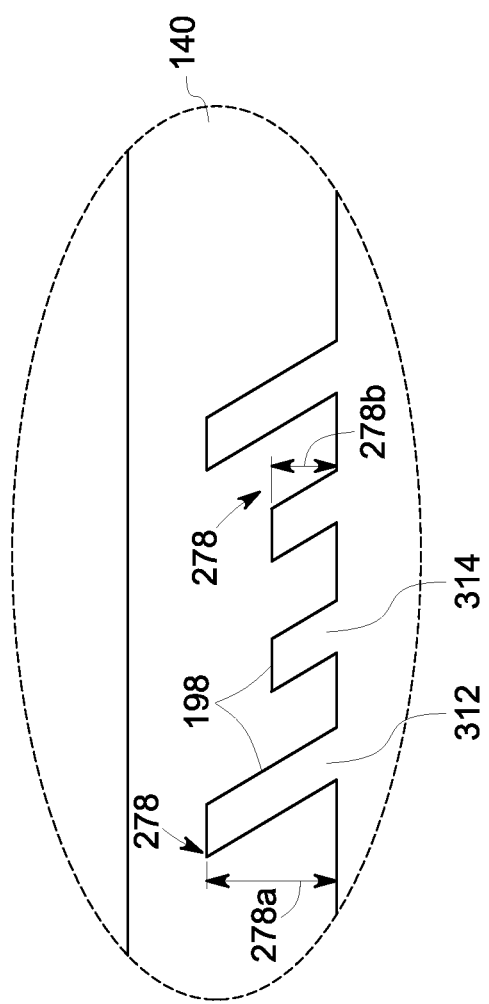
FIG. 17 is a schematic view of a plurality of second recess portions of an end-wall treatment in accordance with one exemplary embodiment.

FIG. 17 is a schematic view of the plurality of second portions 198 of the end-wall treatment 190 in accordance with one exemplary embodiment. The schematic view may be taken along view 16-16 of FIG. 15 including the end-wall treatment 190 embedded at the casing 140. Specifically, the schematic cross-sectional view of the plurality of second portions 198 is an aft looking forward view along the axis (i.e. the longitudinal axis 105) of rotation 204.

The plurality of second recess portion 198 has the radial height 278 as shown in FIGS. 15 and 16. Further one or more second portions 198 among the plurality of second recess portions 198 may have a different radial height 278. In the illustrated embodiment, one second recess portion 312 among the plurality of second recess portions 198 has a radial height 278a and another second recess portion 314 among the plurality of second recess portions 198 has an radial height 278b different the radial height 278a. The variation in the radial height 278 among the plurality of second recess portions 198 may help to control the portion 206 of the fluid flow 160 (as shown in FIGS. 3 and 4) being recirculated into the gaps 210r and 210s (as shown in FIGS. 3, 4, and 5).

The embodiment disclosed in FIGS. 15, 16, and 17, as illustrated, includes the end-wall treatment 190, in the form of the first recess portion 196 integrated to the plurality of second recess portions 198. As illustrated, each second recess portion 198 includes a geometric shape having an overall linear shape from the upstream wall 226r to the downstream wall 224r and between the sidewalls 308, 310. Similar to the previously described embodiments, the first recess portion 196 and each second recess portion 198 may be optimized to provide specific solution for any application that desires an increase in stable operating range. Some of the aspects that may be optimized, include, but are not limited to: (i) the axial lean 280 of the upstream wall 226r and the axial lean 281 of the downstream wall 224r of each second recess portion 198; (ii) the axial lean 286 of the downstream wall 264r and the axial lean 287 of the upstream wall 262r of the first recess portion 196 (iii) the tangential leans 282 and 283 of each second recess portion 198, (iv) the radial height 278 of each second recess portion 198; (v) the radial height 284 of the first recess portion 196, (vi) the overlapping portion 274 and the overhanging portion 276; (vii) the tangential spacing 306 between each second recess portion 198 and within second recess portion 198, (viii) a number of second recess portions 198 and the number of first recess portion 196, (ix) an overall geometric cross-section profile of each second recess portion 198 when viewed in a radial-axial plane; (x) any variation of the above parameters in the radial, axial and tangential direction; and (xi) shape of joining portion 238 (i.e. the wall 240) extending from the first recess portion 196 to each second recess portion 198.

Figure 18:
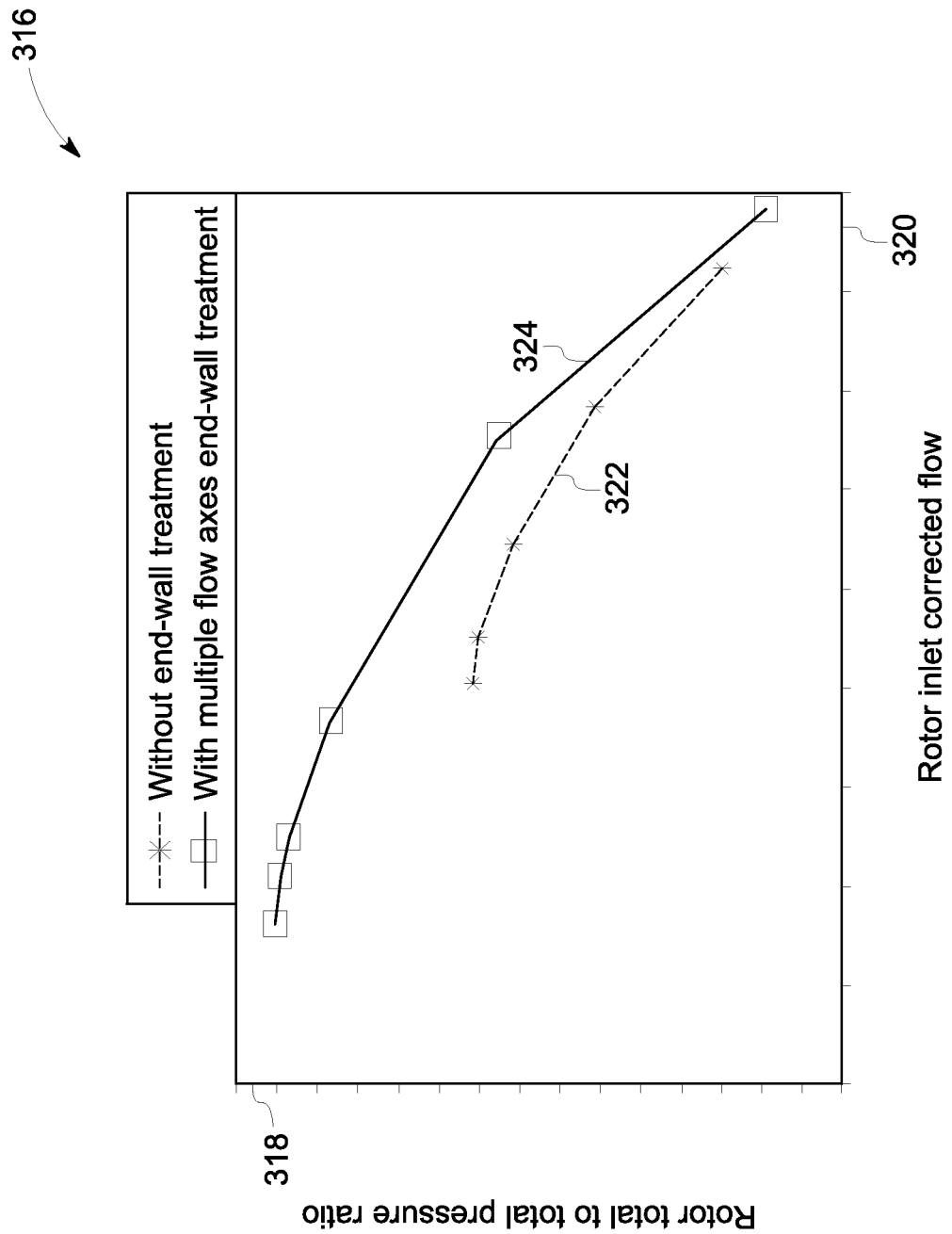
FIG. 18 is a graphical representation illustrating a benefit of a compressor including an end-wall treatment as disclosed in accordance with one or more exemplary embodiments.

Referring now to FIG. 18, illustrated in an exemplary graphical representation, generally referenced 316, is the benefit of the compressor 130 including the end-wall treatment 190 as disclosed herein, and more particularly when applied to a modern compressor, in accordance with an exemplary embodiment. More specifically, graph 316 illustrates the rotor total to total pressure ratios (plotted in axis 318) with rotor-inlet corrected flow (plotted in axis 320) of the compressor without end-wall treatment (plotted in line 322, in accordance with an embodiment shown in FIG. 2), and with the end-wall treatment 190 (plotted in line 324, in accordance with an embodiment described herein. As indicated by line 324, the rotor blades 136r is able continue to provide a pressure rise at a lower mass flow rate when compared with the compressor that does not include end-wall treatment, as plotted at line 322. This extension in stable operating range is only representative and may be optimized to be specific to a desired application. Further, these results were obtained using simulation of the unsteady flow with computational fluid dynamics (CFD). Detailed investigation of the flow simulation results also confirms the primary flow mechanism. As previously indicated, the benefit in extending stable operating range and the impact on compressor efficiency depends on how the first recess portion and each second recess portions are designed relative to the tips 192r and 192s of the rotor and stator blades 136r and 136s respectively.

Accordingly, as disclosed herein and as illustrated in FIGS. 1, and 3-17, provided are various technological advantages and/or improvements over existing compressor treatments, and in particular the end-wall treatment of the present invention provides an increase in stall margin, with minimal penalty on design-point efficiency of the compressor. The proposed first recess portion is disposed along the circumferential direction 101 of the compressor and the plurality of second recess portions is disposed along the axial direction of the compressor, as disclosed herein, have the potential to provide higher stall margins and operability range of the compressor. Further, each second recess portion and the first recess portion may be optimized and adjusted for the application on which they are deployed, which helps in improving the stall margin, with minimal design-point efficiency penalty in the compressor.

Exemplary embodiments of an axial compressor having the end-wall treatment and method of controlling the leakage flow therein are described in detail above. Although the end-wall treatment have been described with reference to an axial compressor, the end-wall treatment as described above may be used in any compressor, including other types of engine apparatus that include a compressor, and particularly those in which an increase in stall margin is desired. Other applications will be apparent to those of skill in the art. Accordingly, the compressor end-wall treatment and method of controlling leakage flow and improving the stall margin as disclosed herein is not limited to use with the specified engine apparatus described herein. Moreover, the present disclosure is not limited to the embodiments of the axial compressor described in detail above. Rather, other variations of the compressor including end-wall treatment embodiments may be utilized within the spirit and scope of the claims.

While only certain features of embodiments have been illustrated and described herein, many modifications and changes will occur to those skilled in the art. It is, therefore, to be understood that the appended embodiments are intended to cover all such modifications and changes as falling within the spirit of the technology.

The invention claimed is:

1. A compressor comprising:
   a casing;
   a hub;
   a flow path formed between the casing and the hub;
   a plurality of blades positioned in the flow path; and
   an end-wall treatment formed in at least one of the casing, and the hub, and facing a tip of each blade among the plurality of blades, wherein the tip of each blade and the end-wall treatment are configured to move relative to each other,
   wherein the end-wall treatment comprises a first straight recess portion defining a downstream wall, an upstream wall and an outer wall disposed between the downstream wall and the upstream wall, the first straight recess portion extending between the upstream wall and the downstream wall annularly along a first axis to maintain a fluid flow straight through the first straight recess portion, and a plurality of second straight recess portions defining a downstream wall, an upstream wall and an outer wall disposed between the downstream wall and the upstream wall, the plurality of second straight recess portions spaced apart from each other and extending from the first straight recess portion along a second axis extending between the upstream wall and the downstream wall, wherein the second axis is different than the first axis to maintain the fluid flow straight through the plurality of second straight recess portions, wherein at least one of the downstream wall of each of the plurality of second straight recess portions is integrated with the upstream wall of the first straight recess portion and the upstream wall of each of the plurality of second straight recess portions is integrated with the downstream wall of the first straight recess portion.

2. The compressor of claim 1, wherein the plurality of second straight recess portions extends along a first direction of the second axis.

3. The compressor of claim 2, wherein the plurality of second straight recess portions extends along a second direction opposite to the first direction, of the second axis.

4. The compressor of claim 1, wherein the plurality of second straight recess portions comprises a first set of recess portions extending along a first direction of the second axis, and a second set of recess portions extending along a second direction opposite to the first direction, of the second axis.

5. The compressor of claim 1, further comprising a joining portion extending from the first straight recess portion to each second straight recess portion, wherein the joining portion comprises a wall which subtends at a predefined angle relative to the first and second straight recess portions.

6. The compressor of claim 1, further comprising a third straight recess portion spaced apart from the first straight recess portion and extending along a third axis to maintain the fluid flows straight through the third straight recess portion.

7. The compressor of claim 1, wherein the first straight recess portion and the plurality of second straight recess portions have an axial lean along an axial direction of the compressor in a range from 5 degrees to 175 degrees relative to a surface of the casing or the hub at which the end-wall treatment is formed.

8. The compressor of claim 1, wherein each second straight recess portion has a tangential lean along a circumferential direction of the compressor in a range from 5 degrees to 175 degrees relative to a surface of the casing or the hub at which the end-wall treatment is formed.

9. The compressor of claim 1, wherein each second straight recess portion has an overlapping region with the tip of each blade, wherein the overlapping region is, in a range from 5 percent to 95 percent of an axial chord length of the tip of each blade.

10. The compressor of claim 1, wherein each second straight recess portion has an overhanging region in front of each blade, wherein the overhanging region is less than 60 percent of an axial chord length of the tip of each blade.

11. The compressor of claim 1, wherein the first straight recess portion and the plurality of second straight recess portions have a radial height of less than 75 percent of an axial chord length of the tip of each blade.

12. The compressor of claim 1, wherein the first straight recess portion has a width of less than 50 percent of an axial chord length of the tip of each blade.

13. The compressor of claim 1, wherein the first axis extends along a circumferential direction of the compressor.

14. The compressor of claim 1, wherein second axis extends along an axial direction of the compressor.

15. A method comprising:
introducing a fluid flow along a flow path formed between a casing and a hub of a compressor, wherein the compressor further comprises a plurality of blades positioned in the flow path;
extracting a portion of the fluid flow into an end-wall treatment formed in at least one of the casing and the hub, and facing a tip of each blade, wherein the end-wall treatment comprises a first straight recess portion defining a downstream wall, an upstream wall and an outer wall disposed between the downstream wall and the upstream wall, the first straight recess portion extending between the upstream wall and the downstream wall, annularly along a first axis, and a plurality of second straight recess portions defining a downstream wall, an upstream wall and an outer wall disposed between the downstream wall and the upstream wall, the plurality of second straight recess portions spaced apart from each other and extending from the first straight recess portion along a second axis extending between the upstream wall and the downstream wall, wherein the second axis is different than the first axis, wherein the tip of each blade and the end-wall treatment are configured to move relative to each other, wherein at least one of the downstream wall of each of the plurality of second straight recess portions is integrated with the upstream wall of the first straight recess portion and the upstream wall of each of the plurality of second straight recess portions is integrated with the downstream wall of the first straight recess portion; and
flowing the portion of the fluid flow along the first axis to maintain a fluid flow straight through the first straight recess portion, and along the second axis to maintain the fluid flow straight through the plurality of second straight recess portions.

16. The method of claim 15, further comprising redistributing at least one of a sub-portion of the fluid flow from the first straight recess portion into the plurality of second straight recess portions, and the sub-portion of the fluid flow from the plurality of second straight recess portions into the first straight recess portion.

17. The method of claim 16, further comprising recirculating the sub-portion and the portion of the fluid flow from the first straight recess portion and plurality of second straight recess portions into a gap formed between the tip of each blade and the end-wall treatment.

18. The method of claim 15, further comprising redistributing at least one of a sub-portion of the fluid flow from the first straight recess portion into a first and second set of recess portions among the plurality of second straight recess portions, and the sub-portion of the fluid flow from the first and second set of recess portions among the plurality of second straight recess portions into the first straight recess portion, wherein the first set of recess portions extends along a first direction of the second axis, and a second set of recess portions extends along a second direction opposite to the first direction, of the second axis.

19. The method of claim 18, further comprising recirculating the sub-portion and the portion of the fluid flow from the first straight recess portion and the first and second set of recess portions among the plurality of second straight recess portions into a gap formed between the tip of each blade and the end-wall treatment.

20. An engine comprising:
a compressor;
a combustor;
a turbine, wherein the compressor, the combustor, and the turbine are configured in a downstream axial flow relationship, the compressor comprising:
a casing;
a hub;
a flow path formed between the casing and the hub;
a plurality of blades positioned in the flow path; and
an end-wall treatment formed in at least one of the casing and the hub, and facing a tip of each blade among the plurality of blades, wherein the tip of each blade and the end-wall treatment are configured to move relative to each other,
wherein the end-wall treatment comprises a first straight recess portion defining a downstream wall, an upstream wall and an outer wall disposed between the downstream wall and the upstream wall, the first straight recess portion extending between the upstream wall and the downstream wall, annularly along a first axis to maintain a fluid flow straight through the first straight recess portion, and a plurality of second straight recess portions defining a downstream wall, an upstream wall and an outer wall disposed between the downstream wall and the upstream wall, the plurality of second straight recess portions spaced apart from each other and extending from the first straight recess portion along a second axis extending between the upstream wall and the downstream wall, wherein the second axis is different than the first axis to maintain the fluid flow straight through the plurality of second straight recess portions, wherein at least one of the downstream wall of each of the plurality of second straight recess portions is integrated with the upstream wall of the first straight recess portion or the upstream wall of each of the plurality of second straight recess portions is integrated with the downstream wall of the first straight recess portion.

\* \* \* \* \*